(12) United States Patent
Baba et al.

(10) Patent No.: US 9,649,853 B2
(45) Date of Patent: May 16, 2017

(54) IMAGE PROCESSING APPARATUS AND METHOD FOR PROCESSING IMAGE

(71) Applicant: CANON KABUSHIKI KAISHA, Tokyo (JP)

(72) Inventors: Naoko Baba, Kawasaki (JP); Yasunori Fujimoto, Inagi (JP); Kazuki Narumi, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/206,012

(22) Filed: Jul. 8, 2016

(65) Prior Publication Data
US 2017/0008300 A1 Jan. 12, 2017

(30) Foreign Application Priority Data

Jul. 10, 2015 (JP) .................. 2015-138901

(51) Int. Cl.
B41J 2/21 (2006.01)
G06K 15/02 (2006.01)
B41J 29/393 (2006.01)
G06K 15/10 (2006.01)

(52) U.S. Cl.
CPC ............ B41J 2/2132 (2013.01); G06K 15/02 (2013.01); *B41J 29/393* (2013.01); *G06K 15/107* (2013.01)

(58) Field of Classification Search
CPC ....... B41J 2/2132; B41J 29/393; G06K 15/02; G06K 15/10; G06K 15/107
See application file for complete search history.

(56) References Cited

U.S. PATENT DOCUMENTS

| 8,786,896 B2* | 7/2014 | Marumoto | G06K 15/107 358/1.2 |
| 2006/0044338 A1* | 3/2006 | Maru | G06K 15/107 347/15 |
| 2011/0234661 A1* | 9/2011 | Goto | B41J 2/2132 347/9 |
| 2015/0273820 A1* | 10/2015 | Nakajima | B41J 11/0085 347/14 |

FOREIGN PATENT DOCUMENTS

JP 2006-305954 A 11/2006
JP 2011-025685 A 2/2011

* cited by examiner

*Primary Examiner* — Julian Huffman
*Assistant Examiner* — Sharon A Polk
(74) *Attorney, Agent, or Firm* — Canon U.S.A., Inc. IP Division

(57) ABSTRACT

Multi-valued data is corrected using different correction values depending on an attribute of an image.

14 Claims, 19 Drawing Sheets

FIG. 8

| INPUT DATA | | | | PASSES IN WHICH INK IS DISCHARGED | | | | | |
|---|---|---|---|---|---|---|---|---|---|
| R | G | B | ATTRIBUTE | Y | M | Pm | C | Pc | Bk |
| 0 | 0 | 0 | B | 1-2 | 1-2 | 3-4 | 1-2 | 3-4 | 1-2 |
| 0 | 0 | 1 | B | 1-2 | 1-2 | 3-4 | 1-2 | 3-4 | 1-2 |
| 0 | 1 | 0 | B | 1-2 | 1-2 | 3-4 | 1-2 | 3-4 | 1-2 |
| 0 | 1 | 1 | B | 1-2 | 1-2 | 3-4 | 1-2 | 3-4 | 1-2 |
| 1 | 1 | 0 | B | 1-2 | 1-2 | 3-4 | 1-2 | 3-4 | 1-2 |
| 1 | 0 | 1 | B | 1-2 | 1-2 | 3-4 | 1-2 | 3-4 | 1-2 |
| 1 | 1 | 1 | B | 1-2 | 1-2 | 3-4 | 1-2 | 3-4 | 1-2 |

⋮

| 255 | 255 | 254 | A | 1-4 | 1-4 | 1-4 | 1-4 | 1-4 | 1-4 |
| 255 | 254 | 255 | A | 1-4 | 1-4 | 1-4 | 1-4 | 1-4 | 1-4 |
| 254 | 255 | 255 | A | 1-4 | 1-4 | 1-4 | 1-4 | 1-4 | 1-4 |

FIG. 10A1
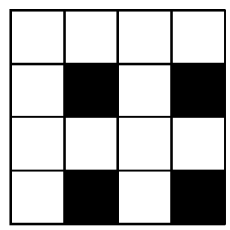
FIG. 10B1
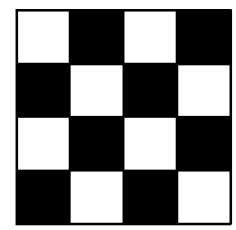
FIG. 10A2
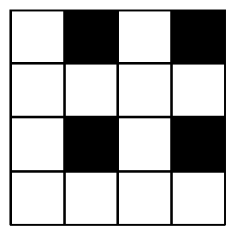
FIG. 10B2
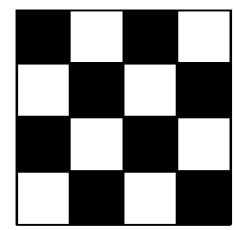
FIG. 10A3
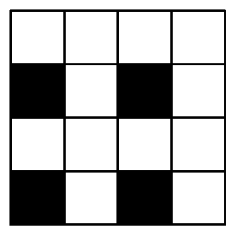
FIG. 10B3
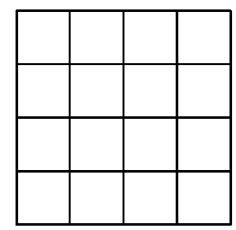
FIG. 10A4
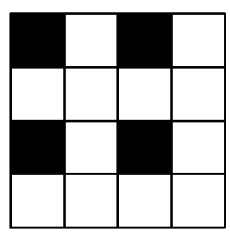
FIG. 10B4
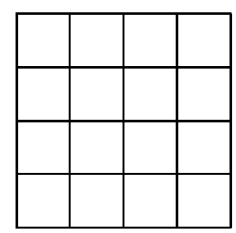

FIG. 14

| | ATTRIBUTE | | CONTRIBUTION RATIO | DENSITY RATIO | AVERAGE DENSITY RATIO | CORRECTION VALUE |
|---|---|---|---|---|---|---|
| RECORDING AREA 211a | B | 1st PASS | 50% | 125% | 120% | 0.833 |
| | | 2nd PASS | 50% | 115% | | |
| | | 3rd PASS | 0% | 105% | | |
| | | 4th PASS | 0% | 95% | | |
| RECORDING AREA 211b | A | 1st PASS | 25% | 125% | 110% | 0.909 |
| | | 2nd PASS | 25% | 115% | | |
| | | 3rd PASS | 25% | 105% | | |
| | | 4th PASS | 25% | 95% | | |
| RECORDING AREA 211c | B | 1st PASS | 50% | 120% | 115% | 0.870 |
| | | 2nd PASS | 50% | 110% | | |
| | | 3rd PASS | 0% | 100% | | |
| | | 4th PASS | 0% | 90% | | |
| RECORDING AREA 211d | A | 1st PASS | 25% | 120% | 105% | 0.952 |
| | | 2nd PASS | 25% | 110% | | |
| | | 3rd PASS | 25% | 100% | | |
| | | 4th PASS | 25% | 90% | | |

FIG. 16A

| 00 | 11 | 00 | 11 | 00 | 11 | 00 | 11 |
|----|----|----|----|----|----|----|----|
| 11 | 01 | 11 | 01 | 11 | 01 | 11 | 01 |
| 00 | 11 | 00 | 11 | 00 | 11 | 00 | 11 |
| 11 | 01 | 11 | 01 | 11 | 01 | 11 | 01 |
| 00 | 11 | 00 | 11 | 00 | 11 | 00 | 11 |
| 11 | 01 | 11 | 01 | 11 | 01 | 11 | 01 |
| 00 | 11 | 00 | 11 | 00 | 11 | 00 | 11 |
| 11 | 01 | 11 | 01 | 11 | 01 | 11 | 01 |

FIG. 16B

| 11 | 01 | 11 | 01 | 11 | 01 | 11 | 01 |
|----|----|----|----|----|----|----|----|
| 00 | 11 | 00 | 11 | 00 | 11 | 00 | 11 |
| 11 | 01 | 11 | 01 | 11 | 01 | 11 | 01 |
| 00 | 11 | 00 | 11 | 00 | 11 | 00 | 11 |
| 11 | 01 | 11 | 01 | 11 | 01 | 11 | 01 |
| 00 | 11 | 00 | 11 | 00 | 11 | 00 | 11 |
| 11 | 01 | 11 | 01 | 11 | 01 | 11 | 01 |
| 00 | 11 | 00 | 11 | 00 | 11 | 00 | 11 |

FIG. 16C

| 00 | 00 | 00 | 00 | 00 | 00 | 00 | 00 |
|----|----|----|----|----|----|----|----|
| 01 | 00 | 01 | 00 | 01 | 00 | 01 | 00 |
| 00 | 00 | 00 | 00 | 00 | 00 | 00 | 00 |
| 01 | 00 | 01 | 00 | 01 | 00 | 01 | 00 |
| 00 | 00 | 00 | 00 | 00 | 00 | 00 | 00 |
| 01 | 00 | 01 | 00 | 01 | 00 | 01 | 00 |
| 00 | 00 | 00 | 00 | 00 | 00 | 00 | 00 |
| 01 | 00 | 01 | 00 | 01 | 00 | 01 | 00 |

FIG. 16D

| 01 | 00 | 01 | 00 | 01 | 00 | 01 | 00 |
|----|----|----|----|----|----|----|----|
| 00 | 00 | 00 | 00 | 00 | 00 | 00 | 00 |
| 01 | 00 | 01 | 00 | 01 | 00 | 01 | 00 |
| 00 | 00 | 00 | 00 | 00 | 00 | 00 | 00 |
| 01 | 00 | 01 | 00 | 01 | 00 | 01 | 00 |
| 00 | 00 | 00 | 00 | 00 | 00 | 00 | 00 |
| 01 | 00 | 01 | 00 | 01 | 00 | 01 | 00 |
| 00 | 00 | 00 | 00 | 00 | 00 | 00 | 00 |

FIG. 17

| ○ : RECORD × : NOT RECORD | | MASK DATA | | |
|---|---|---|---|---|
| | | 00 | 01 | 11 |
| QUANTIZED DATA | 00 | × | × | × |
| | 01 | × | ○ | × |
| | 11 | × | × | ○ |

FIG. 18

| 11 | 11 | 11 | 11 | 01 | 01 | 01 | 01 |
|---|---|---|---|---|---|---|---|
| 11 | 11 | 11 | 11 | 01 | 01 | 01 | 01 |
| 11 | 11 | 11 | 11 | 01 | 01 | 01 | 01 |
| 11 | 11 | 11 | 11 | 01 | 01 | 01 | 01 |
| 11 | 11 | 11 | 11 | 01 | 01 | 01 | 01 |
| 11 | 11 | 11 | 11 | 01 | 01 | 01 | 01 |
| 11 | 11 | 11 | 11 | 01 | 01 | 01 | 01 |
| 11 | 11 | 11 | 11 | 01 | 01 | 01 | 01 |

IMAGE PROCESSING APPARATUS AND METHOD FOR PROCESSING IMAGE

BACKGROUND OF THE INVENTION

Field of the Invention

The present invention relates to an image processing apparatus and a method for processing an image.

Description of the Related Art

An inkjet recording apparatus is known that records an image by repeating a scanning operation in which ink is discharged while a recording head that includes a discharge port column including a plurality of discharge ports that discharge ink is being relatively moved over a unit area of a recording medium in a scanning direction and a sub-scanning operation in which the recording medium is conveyed in a conveying direction, which is perpendicular to the scanning direction. A so-called "multipass recording method" is also known in which such an inkjet recording apparatus forms an image by performing a plurality of scanning operations in a unit area.

It is known that, in an inkjet recording apparatus, discharge characteristics such as the amount of ink discharged and a discharge direction might vary between discharge ports. This can be because of various types of variation such as variation in the diameter of the discharge ports due to manufacturing errors and variation in the amount of heat generated by recording elements that generate thermal energy. If such variation in the discharge characteristics of the discharge ports occurs, color misregistration, in which colors are unintendedly misregistered, might occur in a recorded image. In Japanese Patent Laid-Open No. 2006-305954, test patterns are recorded on a recording medium and correction values for correcting discharge characteristics of discharge ports are obtained on the basis of the test patterns in order to correct original image data on the basis of the correction values. By recording an image in accordance with recording data generated using the corrected image data, color misregistration due to variation in the discharge characteristics can be suppressed.

If recording is performed using the multipass recording method, however, an image corresponding to a certain area of the recording medium is recorded by different discharge ports in a plurality of scanning operations. In view of this, in Japanese Patent Laid-Open No. 2011-025685, correction values for correcting image data corresponding to an image to be recorded in a certain area are calculated on the basis of correction values of a plurality of discharge ports obtained on the basis of test patterns and contribution ratios, which are ratios of contribution of the plurality of discharge ports to the recording in the certain area, of the plurality of discharge ports. The contribution ratios are calculated on the basis of recording permission ratios of mask patterns, which are used for distributing data among a plurality of scanning operations and in which recording permission pixels, in which recording is permitted, and recording inhibition pixels, in which recording is inhibited, are arranged. According to Japanese Patent Laid-Open No. 2011-025685, color misregistration due to variation in the discharge characteristics can be more effectively suppressed using the correction values calculated in the above-described manner.

If data is distributed differently depending on a plurality of partial areas obtained by dividing a unit area of a recording medium, the technique described in Japanese Patent Laid-Open No. 2011-025685 might not be able to perform effective correction. As a result, an image in which color misregistration is conspicuous might be recorded.

SUMMARY OF THE INVENTION

The present invention aims to generate recording data with which recording can be performed while suppressing color misregistration due to variation in discharge characteristics of discharge ports even when data is distributed differently depending on partial areas.

An example of the present invention is an image processing apparatus that generates recording data in which, in each of a plurality of relative scanning operations, which are performed, by a recording head including a discharge port column in which discharge ports for discharging ink are arranged in a certain direction, in a unit area of a recording medium in a direction perpendicular to the certain direction, whether or not to discharge ink from each of a plurality of discharge port groups, which are obtained by dividing the discharge port column in the certain direction, is specified for each of pixel areas in the unit area corresponding to pixels. The image processing apparatus includes a first obtaining unit configured to obtain information regarding a plurality of density values in an image recorded by each of the plurality of discharge port groups, a second obtaining unit configured to obtain image data corresponding to an image recorded in the unit area, a third obtaining unit configured to obtain information regarding an attribute of the image recorded in the unit area, a selection unit configured to select one of a plurality of mask pattern groups, each including a plurality of mask patterns corresponding to the plurality of scanning operations, on the basis of the attribute of the image indicated by the information obtained by the third obtaining unit, a fourth obtaining unit configured to obtain information regarding a plurality of contribution ratios of each of the plurality of discharge port groups on the basis of the mask pattern group selected by the selection unit, the plurality of contribution ratios being ratios of contribution of each of the plurality of discharge port groups to the recording in the unit area, a first generation unit configured to generate a correction value for correcting the image data on the basis of the plurality of density values indicated by the information obtained by the first obtaining unit and the plurality of contribution ratios indicated by the information obtained by the fourth obtaining unit, a second generation unit configured to generate corrected data corresponding to the image recorded in the unit area on the basis of the image data obtained by the second obtaining unit and the correction value generated by the first generation unit, a third generation unit configured to generate quantized data corresponding to the image recorded in the unit area by quantizing the corrected data generated by the second generation unit, and a fourth generation unit configured to generate the recording data on the basis of the quantized data generated by the third generation unit and the mask pattern group selected by the selection unit.

Further features of the present invention will become apparent from the following description of exemplary embodiments with reference to the attached drawings.

BRIEF DESCRIPTION OF THE DRAWINGS

FIG. 8 is a diagram illustrating an example of an attribute determination table in the first embodiment.

FIGS. 10A1 to 10B4 are diagrams illustrating mask patterns in the first embodiment.

FIG. 14 is a diagram illustrating results of calculation of correction values in the first embodiment.

FIGS. 16A to 16D are diagrams illustrating mask patterns in a second embodiment.

FIG. 17 is a diagram illustrating a decoding table in the second embodiment.

FIG. 18 is a diagram illustrating an example of quantized data in the second embodiment.

DESCRIPTION OF THE EMBODIMENTS

Details of a first embodiment of the present invention will be described in detail hereinafter with reference to the drawings.

First Embodiment

Figure 1:
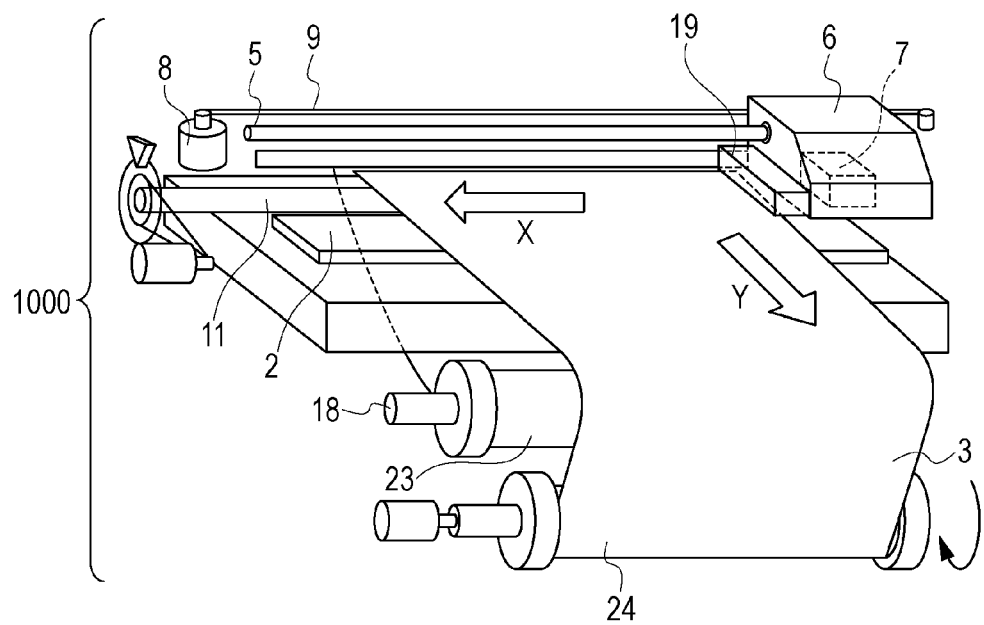
FIG. 1 is a perspective view of an image recording apparatus applied in a first embodiment.
Figure 2:
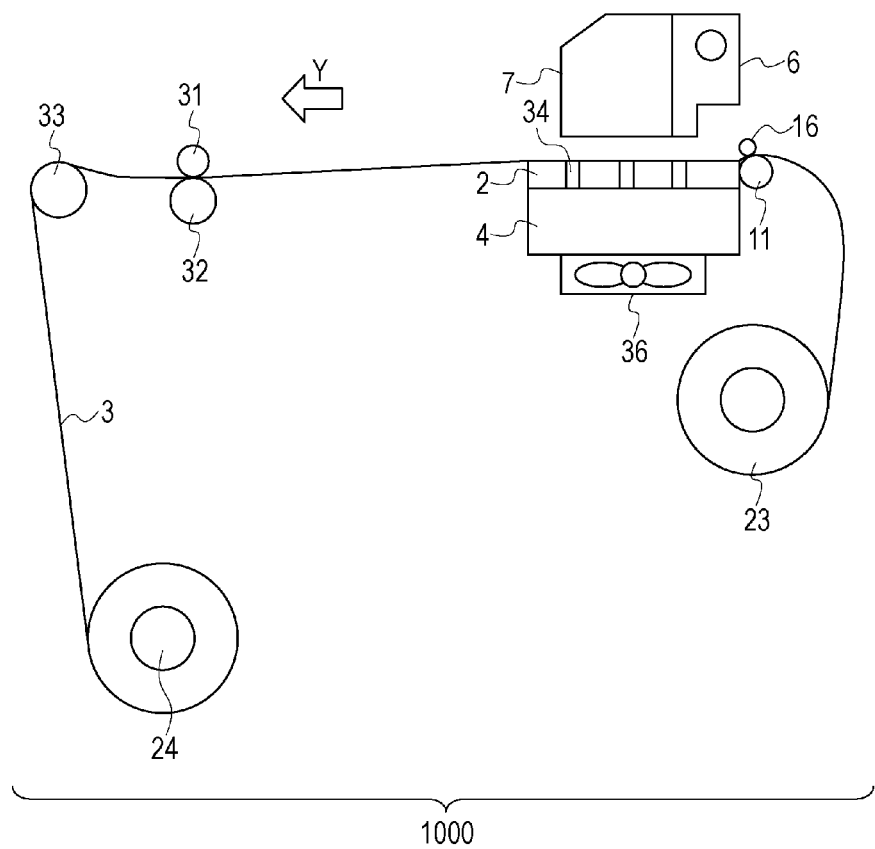
FIG. 2 is a cross-sectional view of an internal configuration of the image recording apparatus applied in the first embodiment.

FIG. 1 is a perspective view of a part of an internal configuration of an image recording apparatus 1000 according to the first embodiment of the present invention. FIG. 2 is a cross-sectional view of a part of the internal configuration of the image recording apparatus 1000 according to the first embodiment of the present invention.

A platen 2 is provided inside the image recording apparatus 1000, and a large number of suction holes 34 are formed in the platen 2 in order to keep a recording medium 3 from separating from the platen 2. The suction holes 34 are connected to ducts, and a suction fan 36 is provided below the ducts. When the suction fan 36 operates, the recording medium 3 sticks to the platen 2.

A carriage 6 is supported by a main rail 5 extending in a paper width direction and is capable of reciprocating in an X direction (perpendicular direction). The carriage 6 includes a recording head 7 employing an inkjet method, which will be described later. The recording head 7 may employ one of various other recording methods, instead, such as a thermal jet method in which a heating element is used and a piezoelectric method in which a piezoelectric element is used. A carriage motor 8 is a driving source for moving the carriage 6 in the X direction, and the rotational driving force thereof is transmitted to the carriage 6 through a belt 9.

Furthermore, a multipurpose sensor 19 is provided on a side of the carriage 6. The multipurpose sensor 19 is used, for example, for detecting the density of ink discharged onto the recording medium 3, the width of the recording medium 3, and a distance between the recording head 7 and the recording medium 3.

The recording medium 3 is fed from a rolled-up medium 23. The recording medium 3 is conveyed over the platen 2 in a Y direction (conveying direction) perpendicular to the X direction. A leading edge of the recording medium 3 is pinched by a pinch roller 16 and a conveying roller 11, and the recording medium 3 is conveyed as the conveying roller 11 operates. The recording medium 3 is pinched by a roller 31 and a discharge roller 32 downstream of the platen 2 in the Y direction and wound on a winding roller 24 after passing by a turn roller 33.

Figure 3:
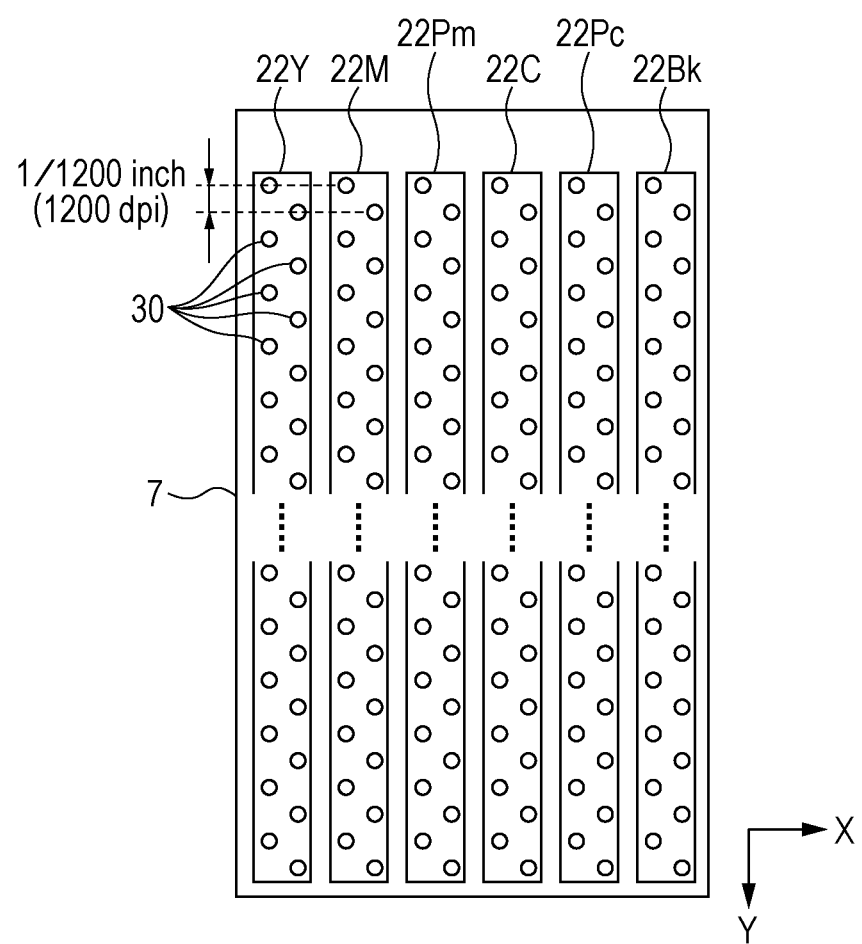
FIG. 3 is a schematic diagram illustrating a recording head applied in the first embodiment.

FIG. 3 is a schematic diagram illustrating the recording head 7 used in the present embodiment.

The recording head 7 includes six discharge port columns 22Y, 22M, 22Pm, 22C, 22Pc, and 22Bk (these discharge port columns will also be generically referred to as "discharge port columns 22" hereinafter) that are capable of discharging yellow (Y), magenta (M), photo magenta (Pm), cyan (C), photo cyan (Pc), and black (Bk) inks, respectively, and that are arranged in this order in the X direction. In each of these discharge port columns 22, 1,280 discharge ports (hereinafter also referred to as "nozzles") 30 that discharge the corresponding ink are provided in the Y direction (certain direction) with a density of 1,200 dpi. Two discharge ports 30 adjacent to each other in the Y direction are arranged at different positions in the X direction. The amount of ink discharged from each discharge port 30 at once is about 4.5 ng in the present embodiment.

The discharge port columns 22 are connected to ink tanks, which are not illustrated, that store and supply the corresponding inks. The recording head 7 and the ink tanks used in the present embodiment may be integrated with each other, or may be separated from each other.

Figure 4A:
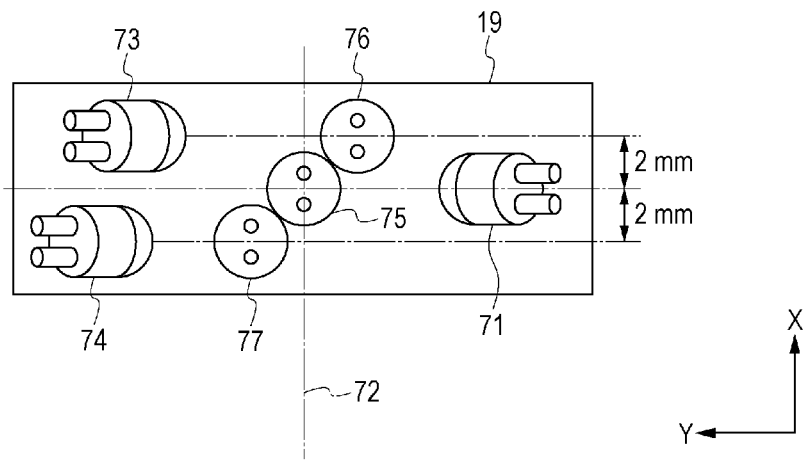
FIGS. 4A and 4B are schematic diagrams illustrating a multipurpose sensor applied in the first embodiment.
Figure 4B:
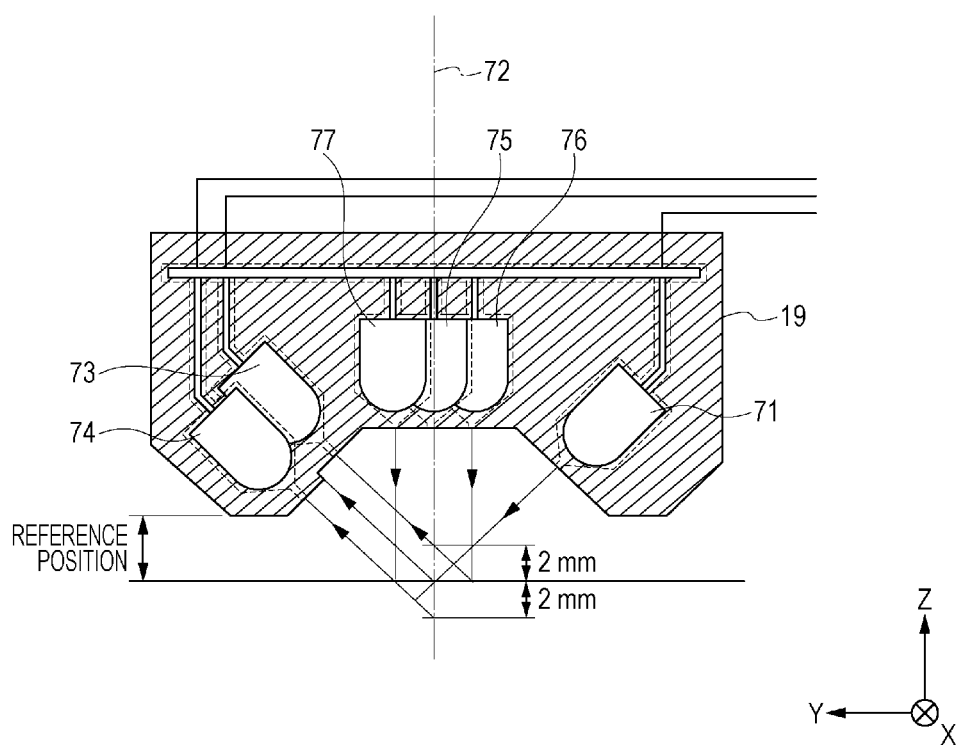

FIGS. 4A and 4B are diagrams illustrating the multipurpose sensor 19 used in the present embodiment. FIG. 4A is a plan view of the multipurpose sensor 19 viewed from vertically below an XY plane, and FIG. 4B is a cross-sectional view of the multipurpose sensor 19 in the Y direction.

The multipurpose sensor 19 includes a total of six optical elements, namely an infrared light-emitting diode (LED) 71, three visible LEDs 75, 76, and 77, and two photodiodes 73 and 74, and an external circuit, which is not illustrated, drives these elements. These elements are bullet-shaped elements (a common mass-produced type of φ1.0 to φ3.1 mm) whose diameters are about 4 mm at maximum.

The infrared LED 71 is a light-emitting device having an illuminating angle of 45 degrees relative to a surface (measurement surface) of the recording medium 3 parallel to the XY plane, and an optical axis of illuminating light (an illumination axis of the infrared LED 71) intersects, at a certain position, with a sensor central axis 72 parallel to a normal of the measurement surface (Z direction). The intersecting position (intersection point) in the Z direction will be referred to as a "reference position", and a shortest distance in the Z direction between the multipurpose sensor 19 and the reference position will be referred to as a "reference distance". The illuminating width of the infrared LED 71 is adjusted by an aperture in the multipurpose sensor 19 through which the illuminating light is emitted from the multipurpose sensor 19. The illuminating width is optimized in such a way as to form an illuminated surface (illumination area) having a diameter of approximately 4 to 5 mm on the measurement surface at the reference position.

In the present embodiment, a straight line connecting a center of the illumination area (range) of the illuminating light emitted from the light-emitting device to the measurement surface and a center of the light-emitting device will be referred to as an "optical axis" (an illumination axis of the light-emitting device) of light emission. The illumination axis is a center of a luminous flux of the illuminating light. The illuminating light from the infrared LED 71 is reflected from the measurement surface. An optical axis that is a center of a luminous flux of the reflected light will be referred to as a "reflection axis" of the infrared LED 71.

Among the three visible LEDs 75, 76, and 77, which are light-emitting devices, the visible LED 75 is a single-color visible LED having an emission wavelength of green (approximately 510 to 530 nm). The visible LED 75 is arranged such that an illumination axis thereof matches the sensor central axis 72.

The visible LED 76 is a single-color visible LED having an emission wavelength of blue (approximately 460 to 480 nm). In FIG. 4A, an illumination axis of the visible LED 76 is parallel to the illumination axis of the visible LED 75, which matches the sensor central axis 72, but a position thereof is different from a position of the visible LED 75 by +2 mm in the X direction and −2 mm in the Y direction.

The visible LED 77 is a single-color visible LED having an emission wavelength of red (approximately 620 to 640 mm). In FIG. 4A, an illumination axis of the visible LED 77 is parallel to the illumination axis of the visible LED 75, which matches the sensor central axis 72, but a position thereof is different from the position of the visible LED 75 by −2 mm in the X direction and +2 mm in the Y direction.

The two photodiodes 73 and 74 are light-receiving devices and sensitive to wavelengths of visible light to infrared light. A light reception axis of the photodiode 73 is parallel to the reflection axis of the infrared LED 71 and intersects with the illumination axis of the visible LED 76 on the measurement surface at the reference position. According to this configuration, a position of the light reception axis of the photodiode 73 is different from a position of the reflection axis of the infrared LED 71 by +2 mm in the X direction, −2 mm in the Y direction, and +2 mm in the Z direction.

Similarly, a light reception axis of the photodiode 74 is parallel to the reflection axis of the infrared LED 71 and intersects with the illumination axis of the visible LED 77 on the measurement surface at the reference position. According to this configuration, a position of the light reception axis of the photodiode 74 is different from the position of the reflection axis of the infrared LED 71 by −2 mm in the X direction, +2 mm in the Y direction, and −2 mm in the Z direction.

A spacer of about 1 mm in thickness is inserted between the two photodiodes 73 and 74 so that light received by the photodiode 73 or 74 does not enter the other. Apertures for limiting incident light are provided in the multipurpose sensor 19 for the photodiodes 73 and 74, and sizes thereof are optimized such that only reflected light whose diameter is 3 to 4 mm on the measurement surface at the reference position is received.

According to the above-described configuration, the measurement surface at the reference position matches the intersection point between the illumination axes of the infrared LED 71 and the visible LED 75, and light reception areas of the two photodiodes 73 and 74 are located on opposite sides of the intersection point.

Figure 5:
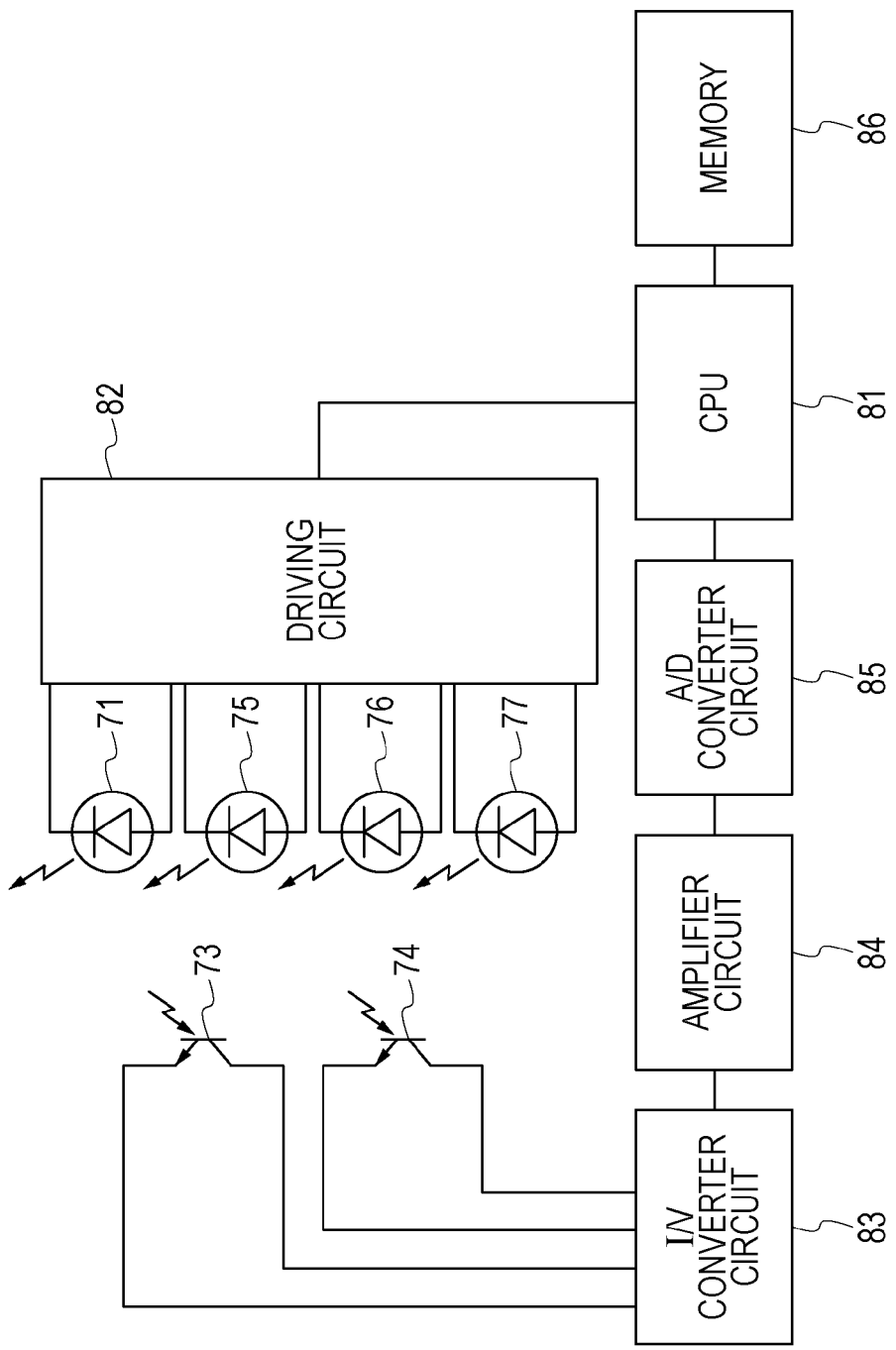
FIG. 5 is a diagram illustrating a control circuit relating to the multipurpose sensor applied in the first embodiment.

FIG. 5 is a schematic diagram illustrating a control circuit that processes input and output signals of the devices of the multipurpose sensor 19 according to the present embodiment.

A central processing unit (CPU) 81, for example, outputs control signals for turning on and off the infrared LED 71 and the visible LEDs 75 to 77, which are light-emitting devices, and calculates output signals obtained in accordance with the amount of light received by the photodiodes 73 and 74, which are light-receiving devices. A driving circuit 82, after receiving signals for turning on the light-emitting devices transmitted from the CPU 81, supplies constant current to the light-emitting devices, and adjusts the amount of light emitted by the light-emitting devices such that the amount of light received by the light-receiving devices achieves certain values. A current-to-voltage (I-to-V) converter circuit 83 converts signals output from the photodiodes 73 and 74 as currents into voltages. An amplifier circuit 84 amplifies the output signals, which are small signals, that have been converted into voltages to an optimal level for analog-to-digital (A/D) conversion. An A/D converter circuit 85 converts the output signals amplified by the amplifier circuit 84 into 10-bit digital values and inputs the digital values to the CPU 81. A memory (e.g., a nonvolatile memory) 86 is used for storing a reference table for obtaining a desired measurement value from a result of the calculation performed by the CPU 81 and temporarily storing output values. As the CPU 81 and the memory 86, a CPU and a random-access memory (RAM) provided in the image recording apparatus 1000 that will be described later may be used, respectively.

The configuration of the multipurpose sensor 19 according to the present embodiment is not limited to this. A colorimeter capable of obtaining spectral data may be used as the multipurpose sensor 19, instead. Alternatively, a densitometer or a colorimeter independent of the image recording apparatus 1000 may be used, or a densitometer or a colorimeter removably attached to the image recording apparatus 1000 may be used.

Figure 6:
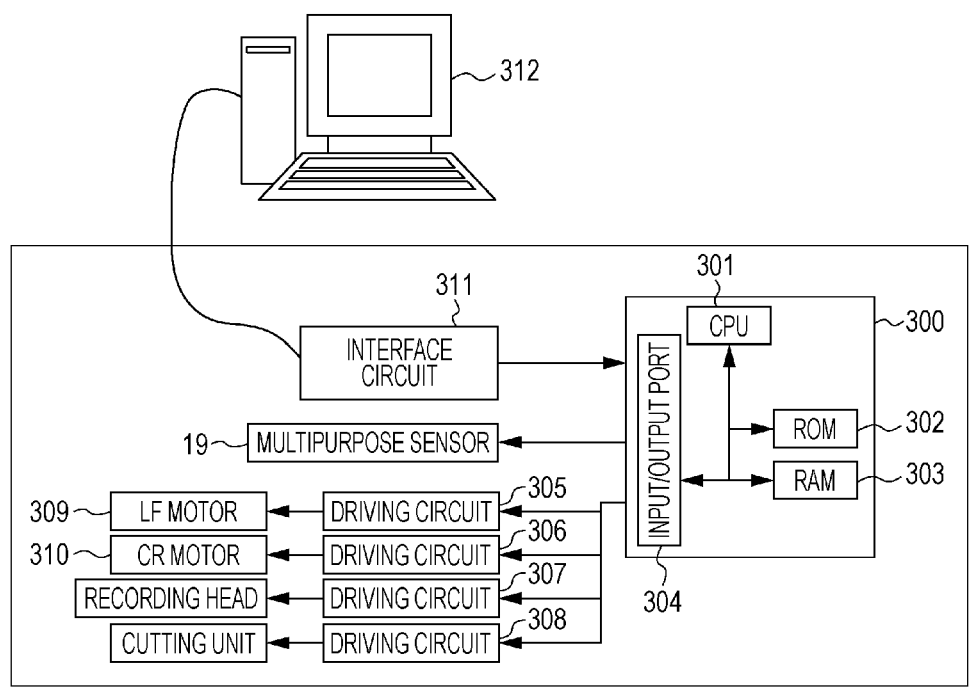
FIG. 6 is a schematic diagram illustrating a recording control system in the first embodiment.

FIG. 6 is a block diagram illustrating a schematic configuration of a recording control system in the present embodiment. A main control unit 300 includes a CPU 301 that performs processing operations such as calculation, selection, determination, and control, a read-only memory (ROM) 302 storing control programs to be executed by the CPU 301 and the like, a RAM 303 used as a buffer for recording data and the like, and an input/output port 304.

In the ROM 302, image data, mask patterns, and a lookup table (also referred to as an "LUT" hereinafter) used for color conversion that will be described later are stored. In the RAM 303, test pattern data, discharge failure nozzle data, and the like that will be described later are stored.

The input/output port 304 is connected to driving circuits 305, 306, 307, and 308 for a conveyor motor (LF motor) 309, a carriage motor (CR motor) 310, and actuators in the recording head 7 and a cutting unit. The input/output port 304 is also connected to the multipurpose sensor 19. The main control unit 300 is connected to a personal computer (PC) 312, which is a host computer, through an interface circuit 311.

Multipass Recording Method

In the present embodiment, an image is recorded using a multipass recording method. The multipass recording method used in the present embodiment will be described in detail hereinafter. In the present embodiment, an image is recorded by moving the recording head 7 over a unit area of the recording medium 3 four times, that is, using a so-called "four-pass recording method" as the multipass recording method.

Figure 7:
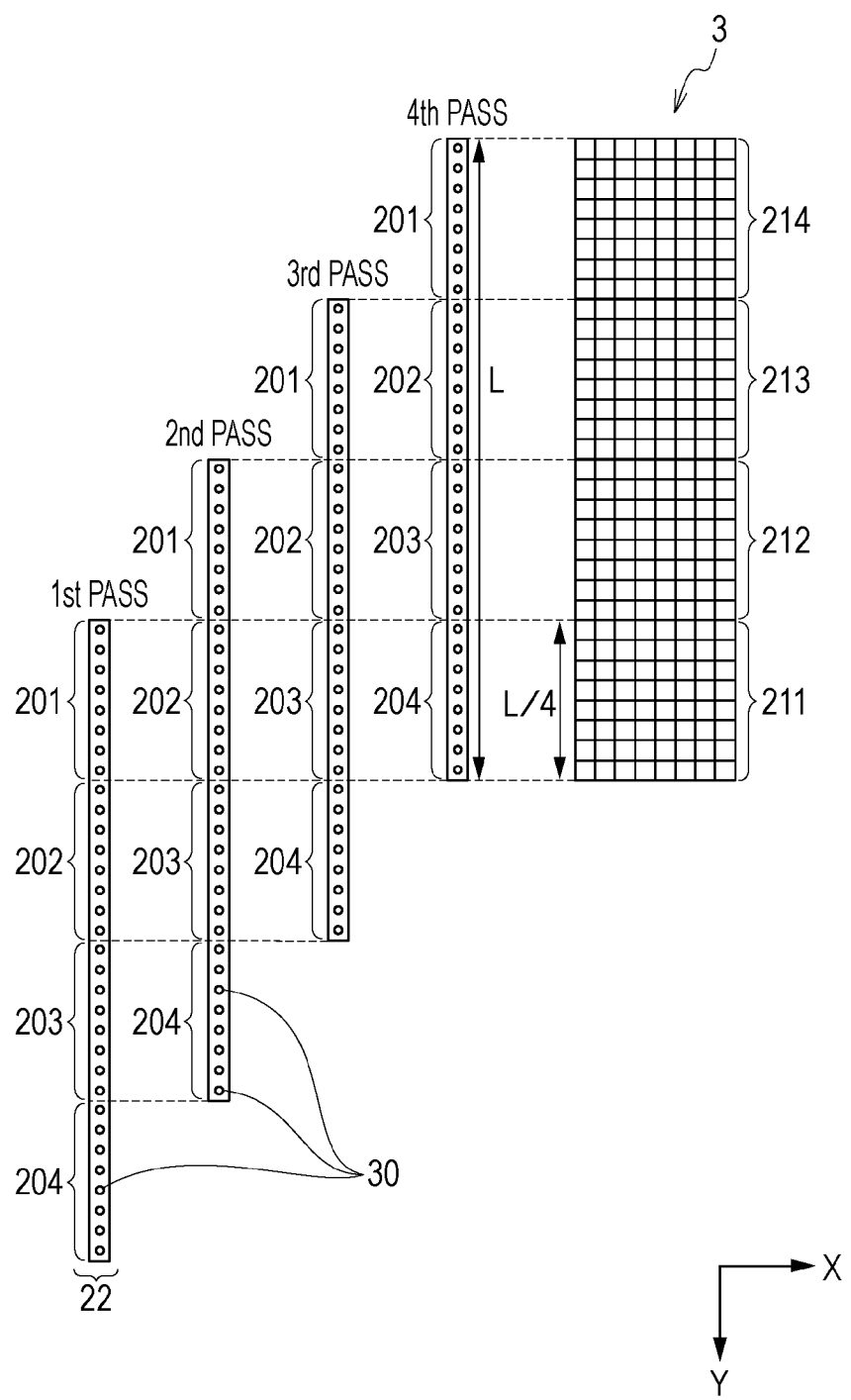
FIG. 7 is a diagram illustrating a multipass recording method used in the first embodiment.

FIG. 7 is a diagram illustrating the multipass recording method used in the present embodiment.

The discharge ports 30 provided in a discharge port column 22 having a length L are divided into four discharge port groups 201, 202, 203, and 204 in the Y direction.

In a first scanning operation (first pass), the discharge port group 201 discharges ink onto a unit area 211 of the recording medium 3.

Next, the recording medium 3 is conveyed downstream in the Y direction relative to the recording head 7 by a distance of L/4. Although a case in which the recording head 7 is conveyed upstream in the Y direction relative to the recording medium 3 is illustrated in FIG. 7 for the sake of simplicity, a relative positional relationship between the recording medium 3 and the recording head 7 after conveying the recording head 7 is the same as when the recording medium 3 is conveyed downstream in the Y direction.

A second scanning operation is then performed. In the second scanning operation (second pass), the discharge port group 202 discharges ink onto the unit area 211, and the discharge port group 201 discharges ink onto a unit area 212.

A scanning operation by the recording head 7 and relative conveying of the recording medium 3 are alternately performed thereafter. As a result, until a fourth scanning operation (fourth pass) is completed, the discharge port groups 201 to 204 have discharged ink onto the unit area 211 of the recording medium 3 once each.

In the present embodiment, two groups of mask patterns are provided for each color of ink, RGB values are obtained for each of a plurality of partial areas obtained by dividing a unit area, and either of the two groups of mask patterns is selected in accordance with an attribute obtained from the RGB values in the above-described multipass recording method. Recording data used for recording is then generated using the mask patterns selected for each partial area.

Although the attribute is determined in units of 4×4=16 pixels used as each partial area and the mask patterns to be used are different for each partial area in the present embodiment, another unit may be used, instead. For example, the same process may be performed for each pixel.

If the density of an image is high, that is, if the sum of RGB values of input data is relatively small, a relatively large amount of ink is applied to the recording medium 3. If inks including pigment are applied to the same area, ink drops applied later might slip on ink drops applied earlier, thereby fixing at unintended positions. This phenomenon frequently occurs especially when the inks contain resin.

If inks (C ink, M ink, Bk ink, and Y ink) whose densities are relatively high are applied to a pixel area corresponding to certain pixels and then ink (Pc ink and Pm ink) whose densities are relatively low are applied, a decrease in the image quality of an obtained image is relatively small because the inks whose densities are relatively low fix at unintended positions. On the other hand, if the inks whose densities are relatively low are applied and then the inks whose densities are relatively high are applied, a decrease in image quality can be significant because the inks whose densities are relatively high fix at unintended positions.

In the present embodiment, therefore, if the sum of RGB values is small, only the inks whose densities are relatively high are discharged in first two of the four scanning operations performed in a unit area, and only the inks whose densities are relatively low are discharged in last two scanning operations, in order to suppress fixing of the inks whose densities are relatively high at unintended positions. In the present embodiment, an attribute of an image for controlling the order of application of the inks will be referred to as an "attribute B".

On the other hand, if the density of an image is low, that is, if the sum of RGB values of input data is relatively large, the inks whose densities are relatively high hardly fix at unintended positions due to the order of application of the inks because the amount of ink applied is relatively small. In this case, therefore, the order of application of the inks is not particularly limited, and all the inks are discharged in a unit area in the same manner in the four scanning operation. As a result, the number of scanning operations performed for each color of ink becomes larger than when the inks are applied in different manners between the scanning operations in a first half and the scanning operations in a second half, thereby maximizing an effect of suppressing a decrease in image quality produced by the multipass recording method. In the present embodiment, an attribute of an image for recording the image without particularly controlling the order of application of the inks will be referred to as an "attribute A".

FIG. 8 is a schematic diagram illustrating an attribute determination table indicating relationships between RGB values of input data and an attribute in the present embodiment. In FIG. 8, which scanning operations each color of ink is discharged in are indicated. When (R, G, B)=(0, 0, 0), for example, "1-2" is indicated for the yellow ink. The yellow ink, therefore, is discharged in the first and second scanning operations.

As can be seen from FIG. 8, for example, input data of (R, G, B)=(255, 255, 255) has the attribute A, that is, all the inks are discharged in the first to fourth passes. On the other hand, input data of (R, G, B)=(0, 0, 0) has the attribute B, that is, the Y, M, C, and K inks, whose densities are relatively high (hereinafter also referred to as "thick inks"), are applied only in the first and second passes and the Pm and Pc inks, whose densities are relatively low (hereinafter referred to as "thin inks"), are applied only in the third and fourth passes.

Alternatively, the attribute may be determined by performing a calculation on the basis of RGB values of input data, instead, without using the attribute determination table illustrated in FIG. 8. If RGB values of input data satisfy the following expression (1), for example, the attribute may be determined as the attribute A, and if RGB values of input data satisfy the following expression (2), the attribute may be determined as the attribute B.

$$R+G+B \geq 384(=256/2 \times 3) \quad (1)$$

$$R+G+B < 384(=256/2 \times 3) \quad (2)$$

Figure 9A:
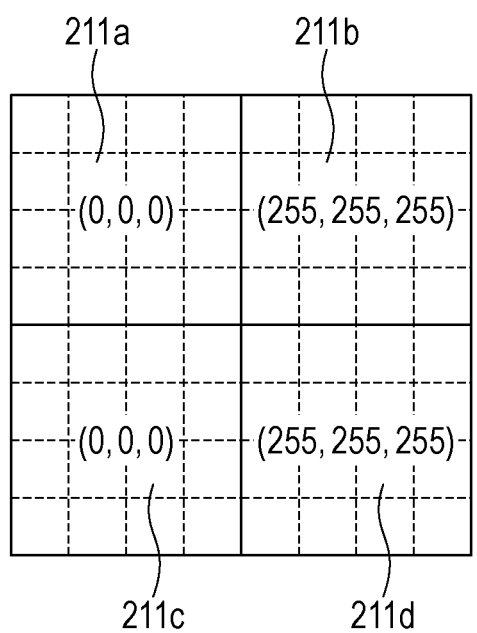
FIGS. 9A and 9B are diagrams illustrating a process for determining an attribute in the first embodiment.
Figure 9B:
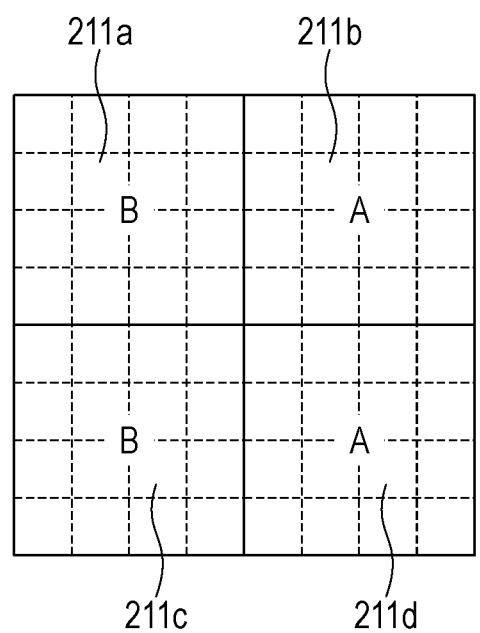

FIGS. 9A and 9B are diagrams schematically illustrating an example in which a process for determining the attribute in the present embodiment is performed in the unit area 211 illustrated in FIG. 7. FIG. 9A illustrates an example of data input in the unit area 211, FIG. 9B illustrates attributes obtained when the data illustrated in FIG. 9A has been input. It is assumed here that an average of input data corresponding to 4×4=16 pixels is an input value corresponding to the 16 pixels.

As illustrated in FIG. 9A, in an upper-left partial area 211a including 16 pixels of the unit area 211, (R, G, B)=(0, 0, 0). Similarly, (R, G, B)=(0, 0, 0) in a lower-left partial area 211c including 16 pixels. As illustrated in FIG. 9B, therefore, the partial areas 211a and 211c are determined to have the attribute B.

On the other hand, as illustrated in FIG. 9A, in an upper-right partial area 211b including 16 pixels of the unit area 211 and a lower-right partial area 211d including 16 pixels, (R, G, B)=(255, 255, 255). The partial areas 211b and 211d, therefore, are determined to have the attribute A.

In the present embodiment, the attribute of each partial area is determined in the above described manner, and recording data is generated by applying different mask patterns in accordance with the attribute.

FIGS. 10A1 to 10A4 are schematic diagrams illustrating mask patterns corresponding to the first to fourth scanning operations, respectively, applied to quantized data corresponding to the C ink at a time when the attribute of an image is the attribute A in the present embodiment. FIGS. 10B1 to 10B4 are schematic diagrams illustrating mask patterns corresponding to the first to fourth scanning operations, respectively, applied to quantized data corresponding to the C ink at a time when the attribute of an image is the attribute A in the present embodiment. Although the mask patterns corresponding to the C ink are illustrated here as an example, different mask patterns are provided for each color of ink in the present embodiment. In the mask patterns illustrated in FIGS. 10A1 to 10B4, black pixels are recording permission pixels, in which discharge of ink is permitted, and white pixels are recording inhibition pixels, in which discharge of ink is inhibited.

If the attribute of an image is the attribute A, recording data is generated such that the inks are evenly discharged in the four scanning operations without particularly controlling the order of application of the inks. As illustrated in FIGS. 10A1 to 10A4, therefore, recording permission ratios of the mask patterns corresponding to the attribute A and the C ink are substantially the same between the first to fourth scanning operations.

A "recording permission ratio" herein refers to a ratio of the number of recording permission pixels to the sum of the number of recording permission pixels and the number of recording inhibition pixels in a mask pattern. In the mask pattern corresponding to the first scanning operation illustrated in FIG. 10A1, for example, four of the 16 pixels are recording permission pixels. The recording permission ratio, therefore, is 25% (=4/16×100). The recording permission ratios of the mask patterns corresponding to the second to fourth scanning operations illustrated in FIGS. 10A2 to 10A4, respectively, too, are 25%.

On the other hand, if the attribute of an image is the attribute B, recording data is generated such that the thick inks are discharged in the scanning operations in the first half (first and second scanning operations) and the thin inks are discharged in the scanning operations in the second half (third and fourth scanning operations). As illustrated in FIGS. 10B1 to 10B4, therefore, recording permission ratios of the mask patterns corresponding to the attribute B and the C ink are higher in the first and second scanning operations than in the third and fourth scanning operations.

In the mask patterns illustrated in FIGS. 10B1 and 10B2 corresponding to the first and second scanning operations, for example, eight of the 16 pixels are recording permission pixels. The recording permission ratios, therefore, are 50% (=8/16×100). On the other hand, in the mask patterns illustrated in FIGS. 10B3 and 10B4 corresponding to the third and fourth scanning operations, recording permission pixels are not provided, that is, the recording permission ratios are 0%. In mask patterns corresponding to the attribute B, a difference between recording permission ratios of mask patterns corresponding to the scanning operations in the second half (third and fourth scanning operations) and recording permission ratios of mask patterns corresponding to the scanning operations in the first half (first and second scanning operations) can be larger than a certain threshold. In the present embodiment, the certain threshold provided for the recording permission ratio is 25% as an example.

As described above, in the present embodiment, different mask patterns are used in accordance with the attribute of a partial area of a unit area. Although a case has been described in which, when the attribute of an image is the attribute A, recording permission ratios of mask patterns are substantially the same as illustrated in FIGS. 10A1 to 10A4 and, when the attribute of an image is the attribute B, recording permission ratios of mask patterns are 50% in the scanning operations in the first half and 0% in the scanning operations in the second half as illustrated in FIGS. 10B1 to 10B4, the advantageous effect produced by the present embodiment can be produced insofar as two groups of mask patterns whose recording permission ratios are different from each other are used. The advantageous effect, however, becomes significant when recording permission ratios are substantially the same in a certain group of mask patterns and a difference between recording permission ratios in the first half and recording permission ratios in the second half is larger than a certain threshold in another group of mask patterns (e.g., 25%).

Process for Obtaining Correction Values in Accordance with Discharge Characteristics In the present embodiment, in order to suppress color misregistration due to variation in discharge characteristics, test patterns are recorded on the recording medium 3, and then density ratios, which indicates differences from an ideal density, are obtained by reading the test patterns. A correction value for correcting multi-valued data of an image is calculated for each partial area on the basis of the density ratios and contribution ratios obtained on the basis of mask patterns selected for each partial area. Color misregistration due to variation in the discharge characteristics is then suppressed by multiplying the multi-valued data by the correction value obtained for each partial area in a process for correcting misregistration, which will be described later.

Figure 11:
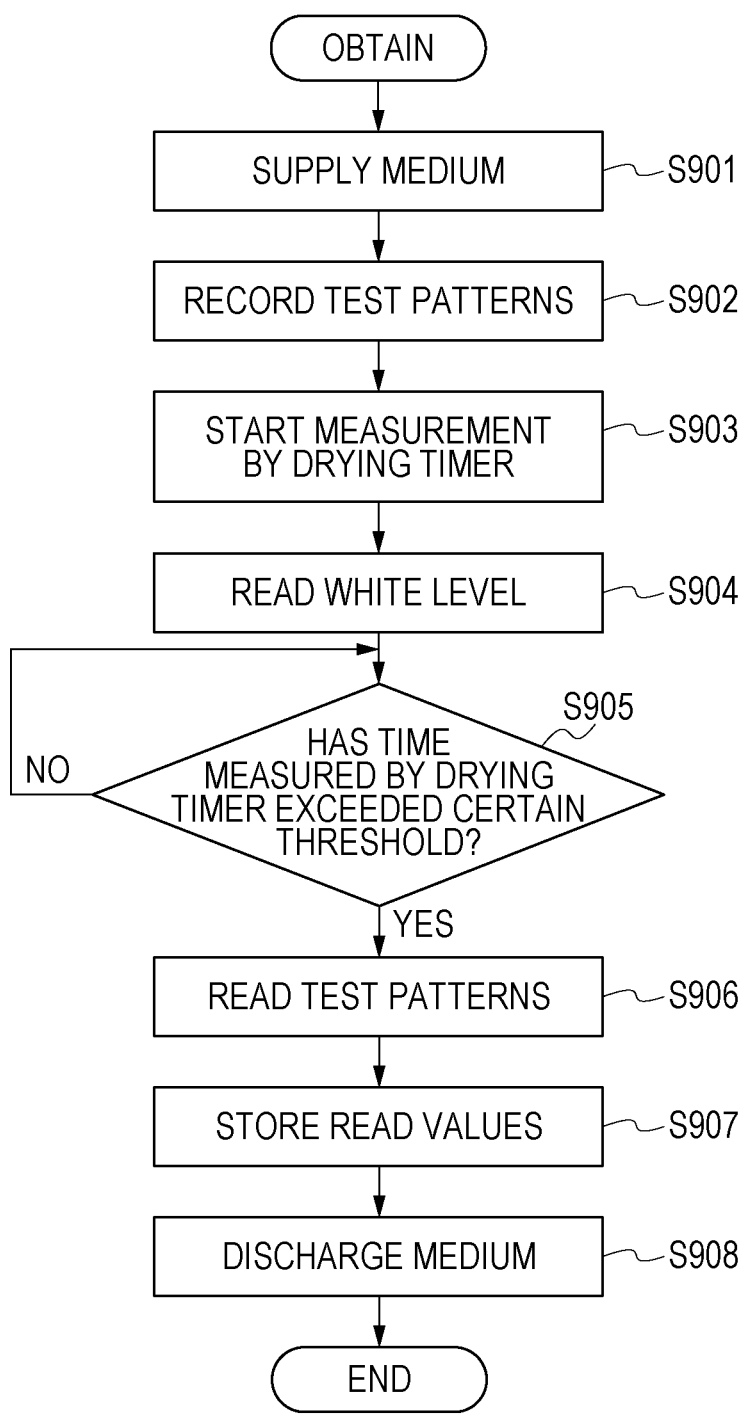
FIG. 11 is a diagram illustrating a process for reading test patterns in the first embodiment.

FIG. 11 is a diagram illustrating a process for reading test patterns in the present embodiment.

If an instruction to start a process for calculating correction values is received, first, the recording medium 3 is supplied in order to record test patterns (step S901). As the instruction, an instruction from a user may be input through a host PC, or the CPU 81 may input an instruction when a certain condition is satisfied. The certain condition here is satisfied, for example, if the recording medium 3 has been changed, if the temperature of an environment in which the image recording apparatus 1000 is installed has changed, or if a certain period of time elapses since a previous process for calculating correction values.

The discharge port groups 201 to 204 of the recording head 7 then discharge ink to record the test patterns (step S902). A solid image is recorded for each color of ink as a test pattern here, but another type of image may be recorded, instead.

Next, a drying timer begins to measure time in order to wait for a certain period of time and dry the test patterns recorded in step S902 (step S903).

Next, a white level without the test patterns recorded (that is, an original color of the recording medium 3) is read (step S904). In this reading, the multipurpose sensor 19 measures intensities of reflected light. A result of the measurement is used as a white reference when densities of the test patterns are calculated later. For this reason, a value of the white level is stored for each LED. Here, the original color of the recording medium 3 is measured as the density of blank portions of the recording medium 3 in which the test patterns are not recorded. If the recording medium 3 is white, the original color of the recording medium 3 is white.

In the present embodiment, an example in which a white recording medium 3 is used will be described. The measurement of the intensities of reflected light is performed by turning on one of the visible LEDs 75 to 77 of the multi-purpose sensor 19 that is suitable for a color of ink whose density is to be measured and reading reflected light using photodiodes 73 and 74 as measuring units that measure the densities of the test patterns.

After the drying timer determines that the certain period of time has elapsed (step S905), the test patterns are read through the measurement of the intensities of light reflected from the test patterns (step S906). The green visible LED 75 turns on when the measurement is performed for the test patterns of the M and Pm inks and the blank portions (white), in which the test patterns are not recorded. The blue visible LED 76 turns on when the measurement is performed for the test patterns of the Y and K inks and the blank portions (white), in which the test patterns are not recorded. The red visible LED 77 turns on when the measurement is performed for the test patterns of the C and Pc inks and the blank portions (white), in which the test patterns are not recorded.

After the test patterns are read in step S906, the densities of the test patterns are calculated on the basis of values output from the test patterns and the blank portions (white). The densities of the test patterns are saved to the ROM 302 or the RAM 303 in the image recording apparatus 1000 (step S907). The recording medium 3 is then discharged (step S908), and the process ends.

The density ratios indicating differences between the ideal density and the actual densities are obtained on the basis of the densities of the test patterns. More specifically, the density ratios, which are ratios of the actual densities to a target value, which corresponds to the ideal density and is stored in the memory 86 of the image recording apparatus 1000, are calculated by comparing the target value with the obtained densities of the test patterns.

Figure 12:
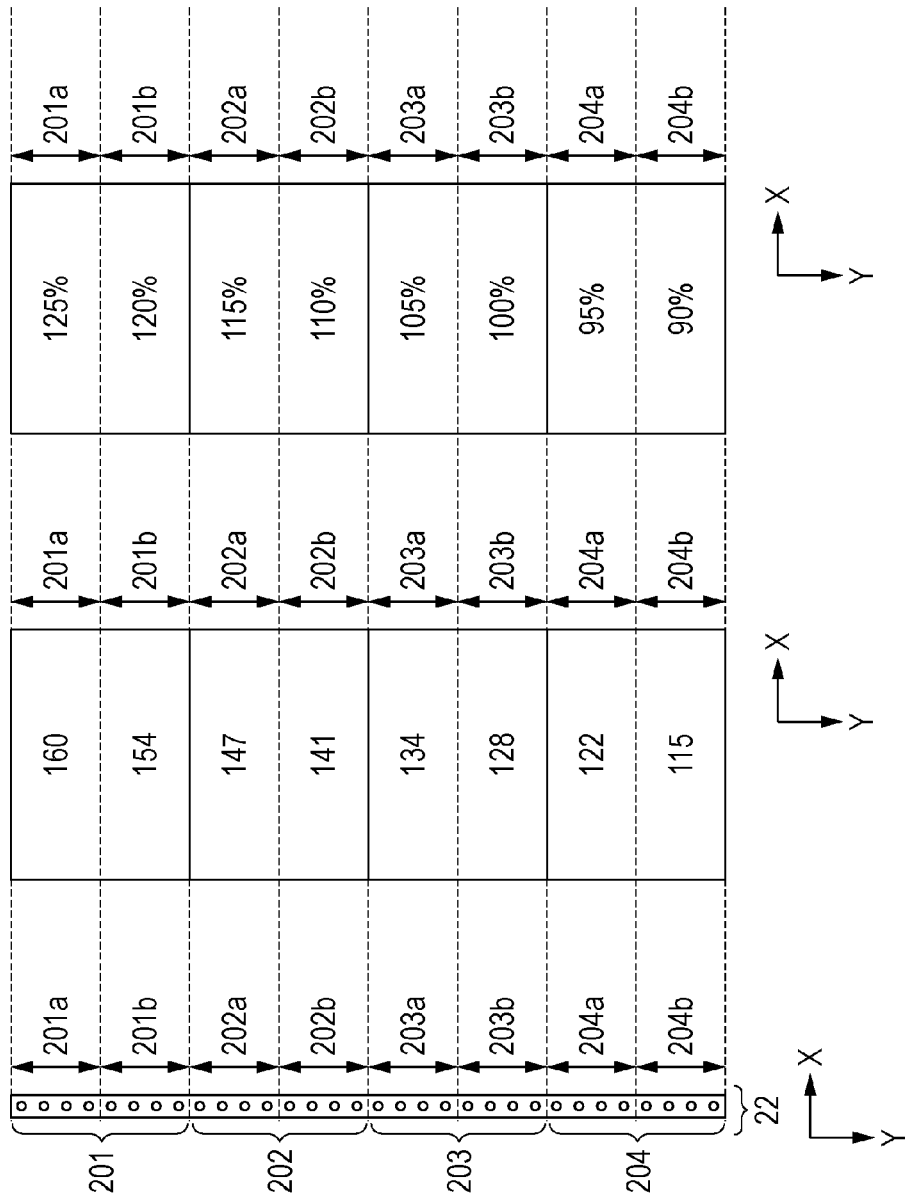
FIGS. 12A to 12C are diagrams illustrating a process for calculating density ratios in the first embodiment.

FIG. 12A is a diagram schematically illustrating the discharge port column 22 illustrated in FIG. 7. FIG. 12B is a diagram schematically illustrating densities of areas at a time when test patterns have been recorded from the discharge port column 22 illustrated in FIG. 12A. FIG. 12C is a diagram schematically illustrating density ratios calculated on the basis of the densities illustrated in FIG. 12B. A case in which the target value is 128 will be described hereinafter.

As illustrated in FIG. 12B, test patterns in which densities are higher upstream of the discharge port column 22 in the Y direction are recorded here.

More specifically, the density of a part 201a of the discharge port group 201 is 160, and the density of a part 201b of the discharge port group 201 is 154. As illustrated in FIG. 12C, therefore, a density ratio of the part 201a is 125% (160/128×100), and a density ratio of the part 201b is 120% (154/128×100).

The density of a part 202a of the discharge port group 202 is 147, and the density of a part 202b is 141. As illustrated in FIG. 12C, therefore, a density ratio of the part 202a is 115% (147/128×100), and a density ratio of the part 202b is 110% (141/128×100).

The density of a part 203a of the discharge port group 203 is 134, and the density of a part 203b is 128. As illustrated in FIG. 12C, therefore, a density ratio of the part 203a is 105% (134/128×100), and a density ratio of the part 203b is 100% (128/128×100).

The density of a part 204a of the discharge port group 204 is 122, and the density of a part 204b is 115. As illustrated in FIG. 12C, therefore, a density ratio of the part 204a is 95% (122/128×100), and a density ratio of the part 204b is 90% (115/128×100).

As can be seen from FIGS. 7, 9A, and 9B, the parts 201a to 204a illustrated in FIG. 12A correspond to the partial areas 211a and 211b of the unit area 211 in the first to fourth scanning operations. In addition, as can be seen from FIGS. 7, 9A, and 9B, the parts 201b to 204b correspond to the partial areas 211c and 211d of the unit area 211 in the first to fourth scanning operations.

A correction value for correcting image data is calculated for each partial area on the basis of the density ratios of the discharge port groups calculated in the above manner and contribution ratios obtained in a manner described below.

Figure 13:
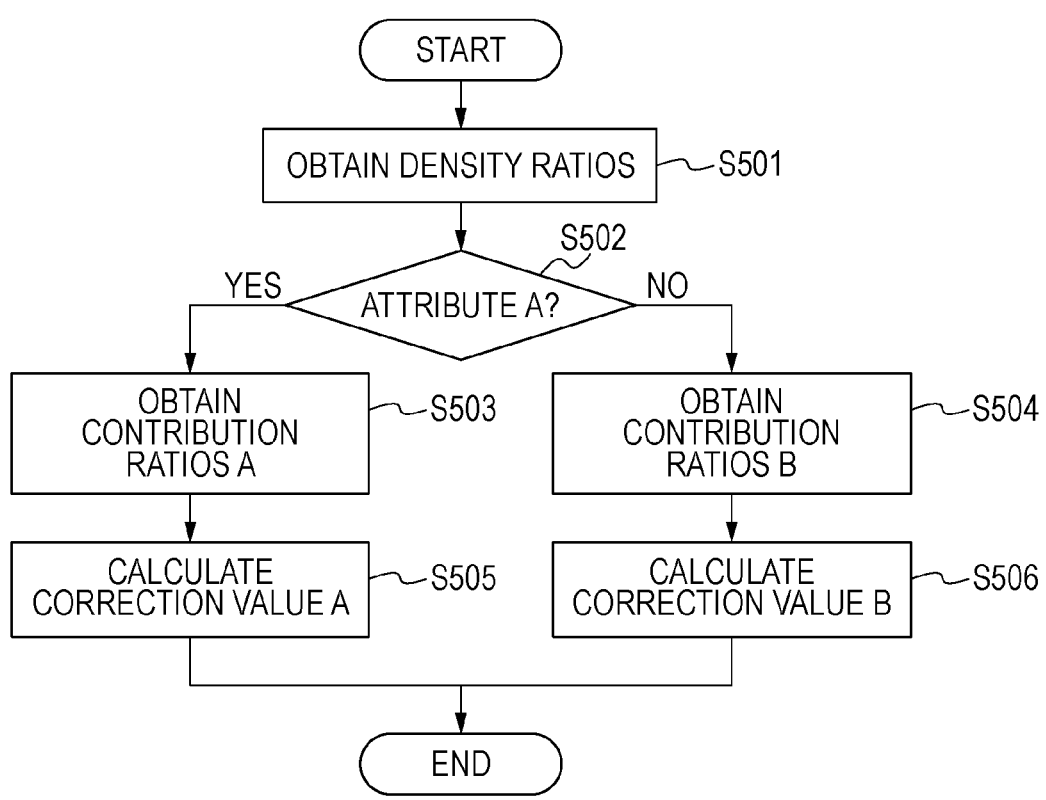
FIG. 13 is a diagram illustrating a process for calculating a correction value in the first embodiment.

FIG. 13 is a flowchart illustrating a process for calculating a correction value for correcting image data for each partial area in the present embodiment.

First, information indicating the density ratios obtained as a result of the reading of the test patterns and stored in the ROM 302, the RAM 303, or the like is read for each part of the discharge port groups.

Next, in step S502, it is determined whether a partial area corresponding to a certain part has the attribute A. If the partial area has the attribute A, the process proceeds to step S503. On the other hand, if the partial area does not have the attribute A, that is, if the partial area has the attribute B, the process proceeds to step S504.

In step S503, contribution ratios A are calculated on the basis of the mask patterns for the attribute A illustrated in FIGS. 10A1 to 10A4.

A "contribution ratio" herein refers to a ratio of contribution of a part of the discharge port groups to a certain partial area in each scanning operation. More specifically, a contribution ratio is a ratio of a recording permission ratio of a certain mask pattern to the sum of recording permission ratios of mask patterns corresponding to a certain partial area.

For example, the recording permission ratio of the mask pattern for the first pass having the attribute A illustrated in FIG. 10A1 is 25%, and the sum of the recording permission ratios of the mask patterns for the attribute A illustrated in FIGS. 10A1 to 10A4 is 100%. A contribution ratio of the first pass in the attribute A, therefore, is 25%.

In step S505, a correction value A for the attribute A is calculated on the basis of the density ratios obtained in step S501 and the contribution ratios A obtained in step S503. In the present embodiment, an average of density ratios of certain parts of the discharge port groups is calculated by multiplying the density ratios by the contribution ratios A in scanning operations corresponding to the certain parts and calculating the sum of the products. The correction values A is then obtained by dividing 100(%) by the average (%) of the density ratios.

On the other hand, in step S504, contribution ratios B are calculated on the basis of the mask patterns for the attribute B illustrated in FIGS. 10B1 to 10B4.

For example, the recording permission ratio of the mask pattern for the first pass having the attribute B illustrated in FIG. 10B1 is 50%, and the sum of the recording permission ratios of the mask patterns for the attribute B illustrated in FIGS. 10B1 to 10B4 is 100%. A contribution ratio of the first pass in the attribute B, therefore, is 50%.

In step S506, the correction value B for the attribute B is calculated on the basis of the density ratios obtained in step S501 and the contribution ratios B obtained in step S504. In the present embodiment, an average of density ratios of certain parts of the discharge port groups is calculated by multiplying the density ratios by the contribution ratio B in scanning operations corresponding to the certain parts and calculating the sum of the products. The correction value B is then obtained by dividing 100(%) by the average (%) of the density ratios.

FIG. 14 is a diagram illustrating correction values calculated in accordance with the flowchart illustrated in FIG. 13. Here, correction values of the partial areas 211a to 211d when attributes of an image have been determined as illustrated in FIGS. 9A and 9B and the density ratios have been obtained as illustrated in FIGS. 12A to 12C are indicated.

First, as illustrated in FIG. 9B, the partial area 211a of the unit area 211 is determined to have the attribute B. The mask patterns illustrated in FIGS. 10B1 to 10B4, therefore, are used. Contribution ratios of the first to fourth scanning operations are, as can been seen from FIGS. 10B1 to 10B4, 50%, 50%, 0%, and 0%, respectively.

On the other hand, as can be seen from FIGS. 7, 12A to 12C, and the like, the partial area 211a corresponds to the parts 201a to 204a in the first to fourth scanning operations, respectively. Here, as can be seen from FIG. 12C, density ratios of the parts 201a to 204a are 125%, 115%, 105%, and 95%, respectively.

Consequently, an average of the density ratios of the partial area 211a is calculated as 120% (=(1.25×0.5+1.15× 0.5+1.05×0+0.95×0)×100). A correction value of the partial area 211a is 0.833 (=100%/120%).

Next, as illustrated in FIG. 9B, the partial area 211b of the unit area 211 is determined to have the attribute A. The mask patterns illustrated in FIGS. 10A1 to 10A4, therefore, are used. Contribution ratios of the first to fourth scanning operations are, as can been seen from FIGS. 10A1 to 10A4, all 25%.

On the other hand, as can be seen from FIGS. 7, 12A to 12C, and the like, the partial area 211b corresponds to the parts 201a to 204a in the first to fourth scanning operations, respectively. Here, as can be seen from FIG. 12C, density ratios of the parts 201a to 204a are 125%, 115%, 105%, and 95%, respectively.

Consequently, an average of the density ratios of the partial area 211b is calculated as 110% (=(1.25×0.25+1.15× 0.25+1.05×0.25+0.95×0.25)×100). A correction value of the partial area 211b is 0.909 (=100%/110%).

Next, as illustrated in FIG. 9B, the partial area 211c of the unit area 211 is determined to have the attribute B. The mask patterns illustrated in FIGS. 10B1 to 10B4, therefore, are used. Contribution ratios of the first to fourth scanning operations are, as can been seen from FIGS. 10B1 to 10B4, 50%, 50%, 0%, and 0%, respectively.

On the other hand, as can be seen from FIGS. 7, 12A to 12C, and the like, the partial area 211c corresponds to the parts 201b to 204b in the first to fourth scanning operations, respectively. Here, as can be seen from FIG. 12C, density ratios of the parts 201b to 204b are 120%, 110%, 100%, and 90%, respectively.

Consequently, an average of the density ratios of the partial area 211c is calculated as 115% (=(1.2×0.5+1.1×0.5+ 1.0×0+0.9×0)×100). A correction value of the partial area 211c is 0.870 (=100%/115%).

Next, as illustrated in FIG. 9B, the partial area 211d of the unit area 211 is determined to have the attribute A. The mask patterns illustrated in FIGS. 10A1 to 10A4, therefore, are used. Contribution ratios of the first to fourth scanning operations are, as can been seen from FIGS. 10A1 to 10A4, all 25%.

On the other hand, as can be seen from FIGS. 7, 12A to 12C, and the like, the partial area 211d corresponds to the parts 201b to 204b in the first to fourth scanning operations, respectively. Here, as can be seen from FIG. 12C, density ratios of the parts 201b to 204b are 120%, 110%, 100%, and 90%, respectively.

As a result, an average of the density ratios of the partial area 211d is calculated as 105% (=(1.2×0.25+1.1×0.25+1.0× 0.25+0.9×0.25)×100). A correction value of the partial area 211d is 0.952 (=100%/105%).

As described above, in the present embodiment, a correction value for suppressing color misregistration is obtained for each partial area of a unit area, and an image is processed using the correction values.

Figure 15:
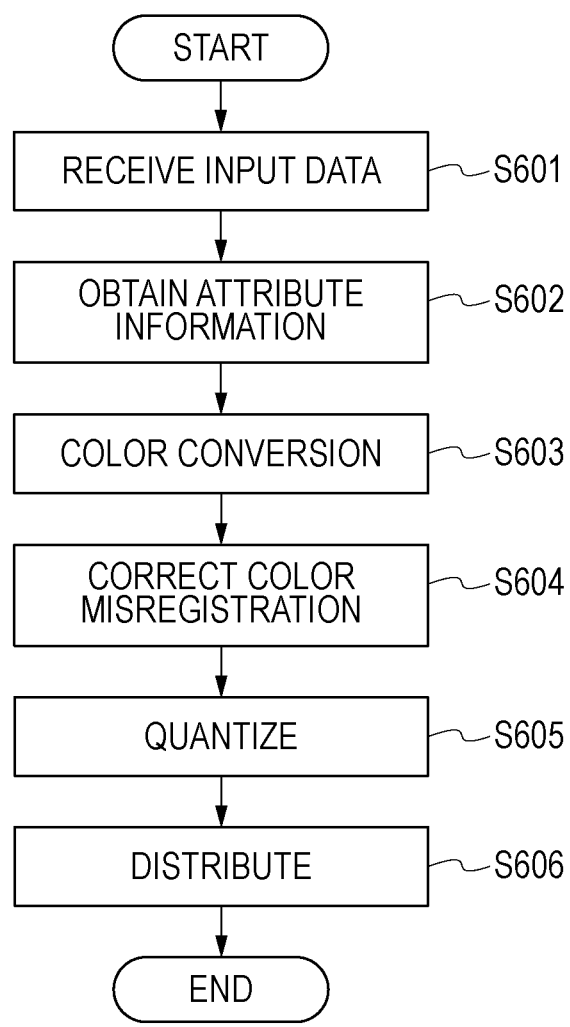
FIG. 15 is a diagram illustrating a process for processing data in the first embodiment.
Figure 19A:
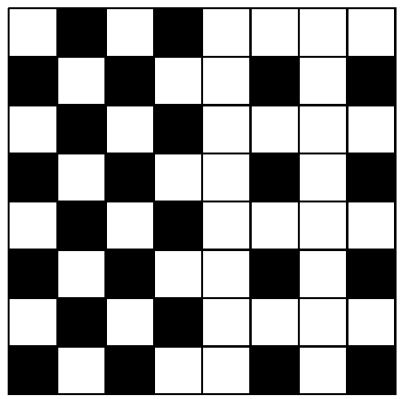
FIGS. 19A to 19D are diagrams illustrating recording data generated in the second embodiment.
Figure 19B:
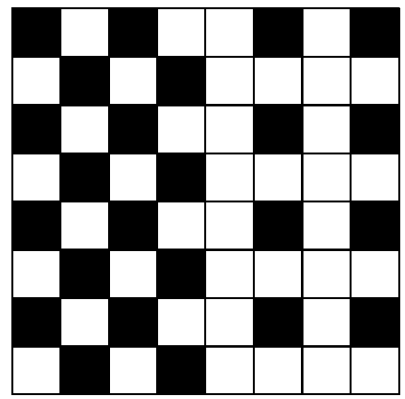
Figure 19C:
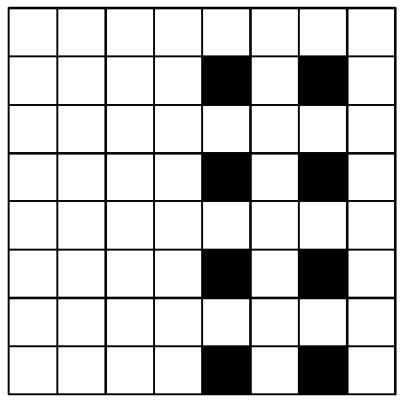
Figure 19D:
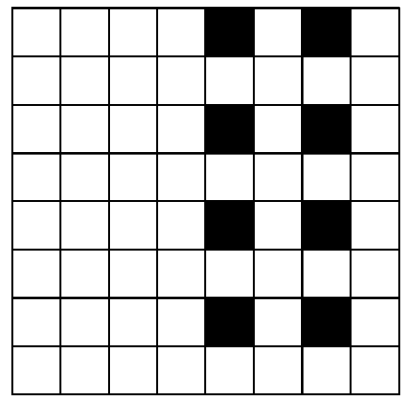

FIG. 15 is a flowchart illustrating a control program for processing input data in the present embodiment.

First, in step S601, the image recording apparatus 1000 receives multi-valued data (input data) in an RGB format input from the PC 312, which is the host computer.

Next, in step S602, information regarding an attribute indicating whether to control the order of application of the inks is obtained for each partial area on the basis of RGB values of the input data. In the present embodiment, the attribute information is obtained using the attribute determination table illustrated in FIG. 8. If, therefore, RGB values of the partial areas 211a to 211d of the unit area 211 are as illustrated in FIG. 9A, for example, the attribute information illustrated in FIG. 9B is obtained.

Next, in step S603, the input data in the RGB format is converted into multi-valued data corresponding to the colors of ink (C, M, Y, K, Pc, and Pm) used for recording.

In step S604, the multi-valued data is multiplied by the correction values of the partial areas calculated in the above-described manner to generate corrected data. As illustrated in FIG. 14, the correction values of the partial areas 211a to 211d are 0.833, 0.909, 0.870, and 0.952, respectively. If, therefore, values of the multi-valued data regarding the partial areas 211a to 211d are all 128, for example, values of the corrected data regarding the partial areas 211a to 211d are 107 (=128×0.833), 116 (=128×0.909), 111 (=128×0.870), and 122 (=128×0.952), respectively.

Next, in step S605, the corrected data is quantized to generate quantized data. Because binarization is performed as the quantization in the present embodiment, binary data is generated. Alternatively, the quantization may be error diffusion, dithering, an index method, or one of various other quantization methods.

In step S606, the quantized data is distributed among the four scanning operations using the mask patterns to generate recording data used for recording. Quantized data corresponding to the partial areas determined in step S602 to have the attribute A is distributed using the mask patterns illustrated in FIGS. 10A1 to 10A4. On the other hand, quantized data corresponding to the partial areas determined in step S602 to have the attribute B is distributed using the mask patterns illustrated in FIGS. 10B1 to 10B4.

As described above, in the present embodiment, a correction value is obtained for each partial area even when different mask patterns are used between the partial areas. As a result, recording can be performed in each recording area while suppressing color misregistration due to variation in the discharge characteristics of discharge ports.

Second Embodiment

In the first embodiment, different mask patterns are applied in accordance with the attribute of an image.

In a second embodiment, on the other hand, flags are turned on or off in image data in accordance with the attribute of an image and then a group of mask patterns is applied in order to generate recording data.

Description of the same points as in the first embodiment is omitted.

FIGS. 16A to 16D are diagrams illustrating mask patterns including 2-bit information for each pixel applied in the present embodiment. FIGS. 16A to 16D illustrate mask patterns corresponding to the first to fourth scanning operations, respectively. FIG. 17 is a diagram illustrating a decoding table specifying relationships between quantized data and a mask pattern applied in the present embodiment.

In the following description, if data is "xy", "y" will be referred to as a "first bit", and "x" will be referred to as a "second bit".

Quantized data in the present embodiment includes 2-bit information (also referred to as a "pixel value" hereinafter) for each pixel. More specifically, a pixel value "00", "01", or "11" is determined for each pixel in quantized data in the present embodiment.

In each of these three pixels values, the first bit specifies whether or not to discharge ink. More specifically, if it is determined in the quantization in step S605 that ink is to be discharged for a certain pixel, the first bit of a pixel value of quantized data corresponding to the certain pixel becomes "1". On the other hand, if it is determined in the quantization in step S605 that ink is not to be discharged for a certain pixel, the first bit of a pixel value of quantized data corresponding to the certain pixel becomes "0".

In each of the three pixel values, the second bit specifies the attribute A or B. More specifically, if it is determined in step S602 that input data in a certain area has the attribute A, the second bit of a pixel value of quantized data corresponding to the certain area becomes "0". On the other hand, if it is determined in step S602 that input data in a certain area has the attribute B, the second bit of a pixel value of quantized data corresponding to the certain area becomes "1".

In short, if quantized data regarding a certain pixel has a pixel value "01", the certain pixel has the attribute A and ink is to be discharged for the certain pixel. If quantized data regarding a certain pixel has a pixel value "11", the certain pixel has the attribute B and ink is to be discharged for the certain pixel. If quantized data regarding a certain pixel has a pixel value "00", ink is not to be discharged for the certain pixel.

As illustrated in FIGS. 16A to 16D, the mask patterns in the present embodiment include 2-bit information (hereinafter referred to as a "code value") for each pixel. More specifically, a pixel value "00", "01", or "11" is determined for each pixel in the mask patterns in the present embodiment.

As can be seen from the decoding table illustrated in FIG. 17, the code value "00" indicates that ink is not to be discharged regardless of whether the pixel value of quantized data is "00", "01", or "11". In other words, a pixel whose code value is "00" is a recording inhibition pixel.

On the other hand, the code value "01" indicates that ink is not to be discharged if the pixel value of quantized data is "00" or "11" but ink is to be discharged if the pixel value is "01". In other words, a pixel whose code value is "01" is a recording permission pixel.

The code value "11" indicates that ink is not to be discharged if the pixel value of quantized data is "00" or "01" but ink is to be discharged if the pixel value is "11". In other words, a pixel whose code value is "11" is a recording permission pixel having the attribute B.

In the mask patterns corresponding to the first to fourth scanning operations illustrated in FIGS. 16A to 16D used in the present embodiment, code values "01" are arranged at exclusive and complementary positions. In other words, in the mask patterns corresponding to the first to fourth scanning operations illustrated in FIGS. 16A to 16D, the logical sum of pixels whose code values are "01" is all the pixels. Code values "11", too, arranged at exclusive and complementary positions. In other words, in the mask patterns corresponding to the first to fourth scanning operations illustrated in FIGS. 16A to 16D, the logical sum of pixels whose code values are "11" is all the pixels.

In the mask patterns corresponding to the first to fourth scanning operations illustrated in FIGS. 16A to 16D used in the present embodiment, the number of pixels whose code values are "01" is substantially the same. A ratio (hereinafter referred to as a "first recording permission ratio") of the number of pixels whose code values are "01" to a total number of pixels in the mask pattern corresponding to the first scanning operation illustrated in FIG. 16A is 25%. In the mask patterns corresponding to the second to fourth scanning operations illustrated in FIGS. 16B to 16D, too, the first recording permission ratios are 25%.

A contribution ratio in the attribute A in the present embodiment is a ratio of the first recording ratio of each mask pattern to the sum of the first recording permission ratios of a plurality of mask patterns. In the mask patterns illustrated in FIGS. 16A to 16D, the sum of the first recording permission ratios is 100%, and the first recording permission ratio of each mask pattern is 25%. A contribution ratio of each of the first to fourth passes in the attribute A, therefore, is 25%.

In the mask patterns corresponding to the third and fourth scanning operations illustrated in FIGS. 16C and 16D, pixels whose code values are "11" are not included. In the mask patterns corresponding to the first and second scanning operations illustrated in FIGS. 16A and 16B used in the present embodiment, on the other hand, the number of pixels whose code values are "11" is substantially the same. Ratios (hereinafter referred to as "second recording permission ratios") of the number of pixels whose code values are "11" to the total number of pixels in the mask patterns corresponding to the first and second scanning operations illustrated in FIGS. 16A and 16B are 50%. On the other hand, second recording permission ratios in the mask patterns corresponding to the third and fourth scanning operations illustrated in FIGS. 16C and 16D are 0%.

A contribution ratio in the attribute B in the present embodiment is a ratio of the second recording ratio of each mask pattern to the sum of the second recording permission ratios of a plurality of mask patterns. In the mask patterns illustrated in FIGS. 16A to 16D, the sum of the second recording permission ratios is 100%. The second recording permission ratio of each mask pattern illustrated in FIGS. 16A and 16B is 50%, and the second recording permission ratio of each mask pattern illustrated in FIGS. 16C and 16D is 0%. A contribution ratio of each of the first and second passes in the attribute B, therefore, is 50%, and a contribution ratio of each of the third and fourth passes in the attribute B is 0%.

Recording data can be generated as in the first embodiment using such mask patterns.

FIG. 18 is a schematic diagram illustrating quantized data generated when, as illustrated in FIG. 9B, a left half of the unit area 211 has been determined to have the attribute B and a right half has been determined to have the attribute A in the process for determining the attribute and it has been determined in the quantization that ink is to be discharged for all pixels.

As illustrated in FIG. 18, since the pixels in the left half have the attribute B, the second bit of a pixel value of each of these pixels becomes "1". Since the pixels in the right half have the attribute A, the second bit of a pixel value of each of these pixels becomes "0". Since ink is to be discharged for every pixel, the first bit of the pixel value of each of the pixels becomes "1".

FIGS. 19A to 19D are diagrams illustrating recording data generated when the mask patterns illustrated in FIGS. 16A to 16D are applied, respectively, to the quantized data illustrated in FIG. 18. In FIGS. 19A to 19D, black pixels are pixels for which ink is to be discharged, and white pixels are pixels for which ink is not to be discharged.

As can be seen from FIGS. 19A to 19D, if, in the first embodiment, the process for determining the attribute is performed as illustrated in FIG. 9B, corresponding mask patterns are selected from the mask patterns illustrated in FIGS. 10A1 to 10B4, and quantized data for performing recording for all the pixels is generated, the same recording data as that illustrated in FIGS. 19A to 19D generated in the present embodiment is generated.

In a subsequent process, the same process as in the first embodiment can be performed by replacing the pixels whose code values are "01" in the mask patterns illustrated in FIGS. 19A to 19D with the recording permission pixels in the mask patterns illustrated in FIG. 10A1 to 10A4, respectively, and the pixels whose code values are "11" in the mask patterns illustrated in FIGS. 19A to 19D with the recording permission pixels in the mask patterns illustrated in FIGS. 10B1 to 10B4, respectively.

As described above, the same advantageous effect as in the first embodiment can be produced in the present embodiment.

Third Embodiment

In the first and second embodiments, recording is performed in the unit area 211 of the recording medium 3 through a plurality of scanning operations.

In a third embodiment, on the other hand, a plurality of recording heads corresponding to colors of ink having a length corresponding to the entirety of the recording medium 3 in a width direction (Z direction) are used, and recording is completed by performing a single relative scanning operation between the plurality of recording heads and the recording medium 3.

Description of the same points as in the first or second embodiment is omitted.

Figure 20:
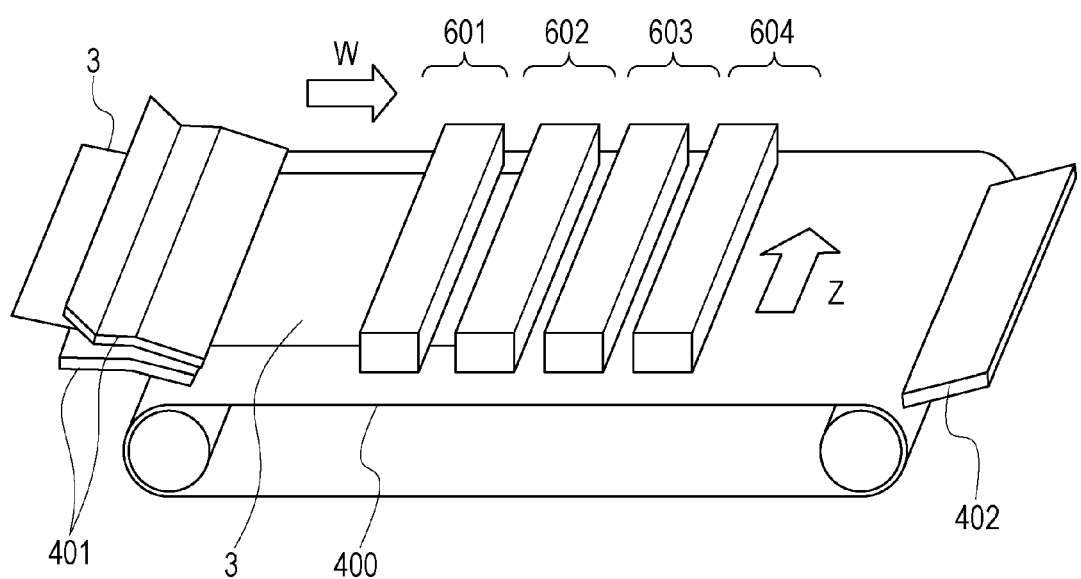
FIG. 20 is a perspective view of an image recording apparatus applied in a third embodiment.

FIG. 20 is a side view of a part of an internal configuration of an image recording apparatus according to the present embodiment.

In each of four recording heads (discharge port column groups) 601 to 604, a certain number of discharge ports (not illustrated) that discharge the yellow (Y), magenta (M), photo magenta (Pm), cyan (C), photo cyan (Pc), and black (Bk) inks are arranged in the Z direction. A total of four discharge port columns that discharge a certain color of ink, therefore, are provided for the recording heads 601 to 604. Each discharge port column is equal to or longer than the recording medium 3 in the Z direction so that recording can be performed in the entirety of the recording medium 3 in the Z direction. The recording heads 601 to 604 are arranged in a W direction, which is perpendicular to the Z direction. The four recording heads 601 to 604 will also be collectively referred to as a "recording unit".

A conveyor belt 400 is a belt for conveying the recording medium 3. As the conveyor belt 400 rotates, the recording medium 3 is conveyed from a feeding unit 401 to a discharge unit 402 in the W direction, which is perpendicular to the Z direction.

In this image recording apparatus, an image can be obtained through a single scanning operation, and a time taken to complete recording can be reduced.

In the present embodiment, the distribution in step S606 is performed on the four discharge port columns that discharge the same color of ink in the recording heads 601 to 604 illustrated in FIG. 20 using the mask patterns corresponding to the scanning operations used in the first embodiment. Quantized data is distributed to the discharge port column of the recording head 601 that discharges a certain color of ink, for example, by selecting the mask pattern illustrated in FIG. 10A1 or the mask pattern illustrated in FIG. 10B1 in accordance with an attribute. The quantized data is distributed to the discharge port column of the recording head 602 that discharges the certain color of ink, for example, by selecting the mask pattern illustrated in FIG. 10A2 or the mask pattern illustrated in FIG. 10B2 in accordance with an attribute. The quantized data is distributed to the discharge port column of the recording head 603 that discharges the certain color of ink, for example, by selecting the mask pattern illustrated in FIG. 10A3 or the mask pattern illustrated in FIG. 10B3 in accordance with an attribute. The quantized data is distributed to the discharge port column of the recording head 604 that discharges the certain color of ink, for example, by selecting the mask pattern illustrated in FIG. 10A4 or the mask pattern illustrated in FIG. 10B4 in accordance with an attribute.

By replacing the description relating to "scanning operations" in the first embodiment with description relating to "discharge port columns", the same advantageous effect as in the first embodiment can be produced.

Although the length of each discharge port column in the Z direction used in the present embodiment corresponds to the width of the recording medium 3, a so-called "joint head", in which a plurality of short discharge port columns are connected to one another in the Z direction, may be used, instead.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Although a partial area in the first embodiment is an area including 4×4 pixels, the size of each partial area may be arbitrarily determined as necessary.

The present invention is not limited to thermal jet recording apparatuses. The present invention can be effectively applied to various image recording apparatuses such as piezoelectric inkjet recording apparatuses that discharge ink using piezoelectric elements.

Although a method for recording an image using an image recording apparatus has been described in each of the above embodiments, the present invention can be applied to a case in which an image processing apparatus, a method for processing an image, or a program for generating data for implementing the method for recording an image described in each of the above embodiments is provided separately from the image recording apparatus, not to mention a case in which the image processing apparatus, the method for processing an image, or the program is included in the image recording apparatus.

The term "recording medium" refers not only to sheets of paper used in common recording apparatuses but also to various other media to which ink can be applied, such as cloth, plastic films, metal sheets, glass, ceramics, wood, and leather.

The term "ink" refers to a liquid that can be used, when applied to a recording medium, for forming an image, a design, a pattern, or the like or processing the recording medium or another ink (e.g., solidifying or insolubilizing a color material contained in the ink applied to the recording medium).

According to the image processing apparatus and the method for processing an image in the present invention, recording data that, even when quantized data is distributed differently depending on a partial area, makes it possible to perform recording while suppressing color misregistration due to variation in discharge characteristics of discharge ports can be generated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-138901, filed Jul. 10, 2015, which is hereby incorporated by reference herein in its entirety.

What is claimed is:

1. An image processing apparatus that generates recording data in which, in each of a plurality of relative scanning operations, which are performed, by a recording head including a discharge port column in which discharge ports for discharging ink are arranged in a certain direction, in a unit area of a recording medium in a direction perpendicular to the certain direction, whether or not to discharge ink from each of a plurality of discharge port groups, which are obtained by dividing the discharge port column in the certain direction, is specified for each of pixel areas in the unit area corresponding to pixels, the image processing apparatus comprising:
   a first obtaining unit configured to obtain information regarding a plurality of density values in an image recorded by each of the plurality of discharge port groups;
   a second obtaining unit configured to obtain image data corresponding to an image recorded in the unit area;
   a third obtaining unit configured to obtain information regarding an attribute of the image recorded in the unit area;
   a selection unit configured to select one of a plurality of mask pattern groups, each including a plurality of mask patterns corresponding to the plurality of scanning operations, on the basis of the attribute of the image indicated by the information obtained by the third obtaining unit;
   a fourth obtaining unit configured to obtain information regarding a plurality of contribution ratios of each of the plurality of discharge port groups on the basis of the mask pattern group selected by the selection unit, the plurality of contribution ratios being ratios of contribution of each of the plurality of discharge port groups to the recording in the unit area;
   a first generation unit configured to generate a correction value for correcting the image data on the basis of the plurality of density values indicated by the information obtained by the first obtaining unit and the plurality of contribution ratios indicated by the information obtained by the fourth obtaining unit;
   a second generation unit configured to generate corrected data corresponding to the image recorded in the unit area on the basis of the image data obtained by the second obtaining unit and the correction value generated by the first generation unit;
   a third generation unit configured to generate quantized data corresponding to the image recorded in the unit area by quantizing the corrected data generated by the second generation unit; and
   a fourth generation unit configured to generate the recording data on the basis of the quantized data generated by the third generation unit and the mask pattern group selected by the selection unit.

2. The image processing apparatus according to claim 1, wherein, in the plurality of mask patterns belonging to each of the plurality of mask pattern groups, recording permission pixels, in which recording is permitted, and recording inhibition pixels, in which recording is inhibited, are arranged, and
   wherein the fourth obtaining unit obtains the information regarding the plurality of contribution ratios of each of the plurality of discharge port groups on the basis of recording permission ratios of the plurality of mask patterns belonging to the mask pattern group selected by the selection unit.

3. The image processing apparatus according to claim 2, wherein the fourth obtaining unit obtains, as information regarding each of the plurality of contribution ratios of each of the plurality of discharge port groups, a ratio of each of the recording permission ratios of the plurality of mask patterns belonging to the mask pattern group selected by the selection unit to a sum of the recording permission ratios of the plurality of mask patterns belonging to the mask pattern group.

4. The image processing apparatus according to claim 1, further comprising:
a recording control unit configured to record a plurality of test patterns by discharging ink from the plurality of discharge port groups,
wherein the first obtaining unit obtains the information regarding the plurality of density values on the basis of the plurality of test patterns recorded by the recording control unit.

5. The image processing apparatus according to claim 1, wherein the first generation unit generates a plurality of second correction values of each of the plurality of discharge port groups by multiplying the plurality of density values indicated by the information obtained by the first obtaining unit by the plurality of contribution ratios indicated by the information obtained by the fourth obtaining unit and generates a sum of the plurality of second correction values as the correction value.

6. The image processing apparatus according to claim 5, wherein the second generation unit generates the corrected data by multiplying the image data obtained by the second obtaining unit by the plurality of second correction values generated by the first generation unit.

7. The image processing apparatus according to claim 1, wherein the plurality of mask pattern groups at least include a first mask pattern group and a second mask pattern group that at least includes a mask pattern whose recording permission ratio is different from recording permission ratios of a plurality of mask patterns belonging to the first mask pattern group.

8. The image processing apparatus according to claim 7, wherein the plurality of mask patterns belonging to the first mask pattern group have substantially same recording permission ratios.

9. The image processing apparatus according to claim 7, wherein, in a plurality of mask patterns belonging to the second mask pattern group, a difference between a recording permission ratio of each of a plurality of mask patterns corresponding to a first half of the plurality of scanning operations and a recording permission ratio of each of a plurality of mask patterns corresponding to a second half of the plurality of scanning operations is larger than a certain threshold.

10. The image processing apparatus according to claim 1, wherein the third obtaining unit obtains information regarding an attribute of an image for each of a plurality of partial areas obtained by dividing the unit area, and
wherein the selection unit selects one of the plurality of mask pattern groups for each of the plurality of partial areas.

11. The image processing apparatus according to claim 1, further comprising:
another recording head.

12. An image processing apparatus that generates recording data in which, in a relative scanning operation, which is performed, by a recording head including a plurality of discharge port columns in each of which discharge ports for discharging ink are arranged in a certain direction, in a unit area of a recording medium in a direction perpendicular to the certain direction, whether or not to discharge ink from each of a plurality of discharge port groups, which are located in the plurality of discharge port columns at certain positions in the certain direction, is specified for each of pixel areas in the unit area corresponding to pixels, the image processing apparatus comprising:
a first obtaining unit configured to obtain information regarding a plurality of first correction values for correcting an amount of ink discharged from the plurality of discharge port groups;
a second obtaining unit configured to obtain image data corresponding to an image recorded in the unit area;
a third obtaining unit configured to obtain information regarding an attribute of the image recorded in the unit area;
a selection unit configured to select one of a plurality of mask pattern groups, each including a plurality of mask patterns corresponding to the plurality of discharge port columns, on the basis of the attribute of the image indicated by the information obtained by the third obtaining unit;
a fourth obtaining unit configured to obtain information regarding a plurality of contribution ratios of each of the plurality of discharge port groups on the basis of the mask pattern group selected by the selection unit, the plurality of contribution ratios being ratios of contribution of each of the plurality of discharge port groups to the recording in the unit area;
a first generation unit configured to generate a second correction value for correcting the image data on the basis of the plurality of first correction values indicated by the information obtained by the first obtaining unit and the plurality of contribution ratios indicated by the information obtained by the fourth obtaining unit;
a second generation unit configured to generate corrected data corresponding to the image recorded in the unit area on the basis of the image data obtained by the second obtaining unit and the second correction value generated by the first generation unit;
a third generation unit configured to generate quantized data corresponding to the image recorded in the unit area by quantizing the corrected data generated by the second generation unit; and
a fourth generation unit configured to generate the recording data on the basis of the quantized data generated by the third generation unit and the mask pattern group selected by the selection unit.

13. A method for processing an image in which, in each of a plurality of relative scanning operations, which are performed, by a recording head including a discharge port column in which discharge ports for discharging ink are arranged in a certain direction, in a unit area of a recording medium in a direction perpendicular to the certain direction, recording data is generated in which whether or not to discharge ink from each of a plurality of discharge port groups, which are obtained by dividing the discharge port column in the certain direction, is specified for each of pixel areas in the unit area corresponding to pixels, the method comprising the step of:
obtaining information regarding a plurality of density values in an image recorded by each of the plurality of discharge port groups;
obtaining image data corresponding to an image recorded in the unit area;
obtaining information regarding an attribute of the image recorded in the unit area;
selecting one of a plurality of mask pattern groups, each including a plurality of mask patterns corresponding to the plurality of scanning operations, on the basis of the attribute of the image indicated by the information obtained in the step of obtaining information regarding an attribute of the image;

obtaining information regarding a plurality of contribution ratios of each of the plurality of discharge port groups on the basis of the mask pattern group selected in the step of selecting, the plurality of contribution ratios being ratios of contribution of each of the plurality of discharge port groups to the recording in the unit area;

generating a correction value for correcting the image data on the basis of the plurality of density values indicated by the information obtained in the step of obtaining information regarding a plurality of density values and the plurality of contribution ratios indicated by the information obtained in the step of obtaining information regarding a plurality of contribution ratios;

generating corrected data corresponding to the image recorded in the unit area on the basis of the image data obtained in the step of obtaining image data and the correction value generated in the step of generating a correction value;

generating quantized data corresponding to the image recorded in the unit area by quantizing the corrected data generated in the step of generating corrected data; and generating the recording data on the basis of the quantized data generated in the step of generating quantized data and the mask pattern group selected in the step of selecting.

14. A method for processing an image in which, in a relative scanning operation, which is performed, by a recording head including a plurality of discharge port columns in each of which discharge ports for discharging ink are arranged in a certain direction, in a unit area of a recording medium in a direction perpendicular to the certain direction, recording data is generated in which whether or not to discharge ink from each of a plurality of discharge port groups, which are located in the plurality of discharge port columns at certain positions in the certain direction, is specified for each of pixel areas in the unit area corresponding to pixels, the method comprising the steps of:

obtaining information regarding a plurality of first correction values for correcting an amount of ink discharged from the plurality of discharge port groups;

obtaining image data corresponding to an image recorded in the unit area;

obtaining information regarding an attribute of the image recorded in the unit area;

selecting one of a plurality of mask pattern groups, each including a plurality of mask patterns corresponding to the plurality of discharge port columns, stored in a memory on the basis of the attribute of the image indicated by the information obtained in the step of obtaining information regarding an attribute of the image;

obtaining information regarding a plurality of contribution ratios of each of the plurality of discharge port groups on the basis of the mask pattern group selected in the step of selecting, the plurality of contribution ratios being ratios of contribution of each of the plurality of discharge port groups to the recording in the unit area;

generating a second correction value for correcting the image data on the basis of the plurality of first correction values indicated by the information obtained in the step of obtaining information regarding a plurality of first correction values and the plurality of contribution ratios indicated by the information obtained in the step of obtaining information regarding a plurality of contribution ratios;

generating corrected data corresponding to the image recorded in the unit area on the basis of the image data obtained in the step of obtaining image data and the second correction value generated in the step of generating a second correction value;

generating quantized data corresponding to the image recorded in the unit area by quantizing the corrected data generated in the step of generating corrected data; and generating the recording data on the basis of the quantized data generated in the step of generating quantized data and the mask pattern group selected in the step of selecting.

* * * * *